(12) United States Patent
Yoon

(10) Patent No.: US 12,549,266 B2
(45) Date of Patent: Feb. 10, 2026

(54) ELECTRONIC DEVICE AND OPERATION METHOD THEREOF

(71) Applicant: SAMSUNG ELECTRONICS CO., LTD., Suwon-si (KR)

(72) Inventor: Sukun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 18/296,580

(22) Filed: Apr. 6, 2023

(65) Prior Publication Data

US 2023/0246722 A1    Aug. 3, 2023

Related U.S. Application Data

(63) Continuation of application No. PCT/KR2021/013694, filed on Oct. 6, 2021.

(30) Foreign Application Priority Data

Oct. 7, 2020    (KR) .................. 10-2020-0129463

(51) Int. Cl.
*H04B 17/318*    (2015.01)
*H04B 17/382*    (2015.01)
*H04W 4/80*    (2018.01)

(52) U.S. Cl.
CPC ......... *H04B 17/318* (2015.01); *H04B 17/382* (2015.01); *H04W 4/80* (2018.02)

(58) Field of Classification Search
CPC .............................. H04B 17/318; H04B 4/80
See application file for complete search history.

(56) References Cited

U.S. PATENT DOCUMENTS 7,669,767 B2     3/2010  Sugano et al.
8,315,552 B2 *  11/2012  Yu .......................... G09B 15/00
                                                                434/319

(Continued)

FOREIGN PATENT DOCUMENTS

JP          4850548 B2    10/2011
JP       2017016309 A     1/2017

(Continued)

OTHER PUBLICATIONS

International Search Report for PCT/KR2021/013694 mailed Dec. 10, 2021, 2 pages.

(Continued)

*Primary Examiner* — Wen W Huang
(74) *Attorney, Agent, or Firm* — NIXON & VANDERHYE P.C.

(57) ABSTRACT

Provided is an electronic apparatus and an operating method thereof. The electronic apparatus includes: a wireless communication module comprising communication circuitry, a memory storing one or more instructions, and a processor configured to execute the one or more instructions stored in the memory to: receive a wireless signal from an external device through the wireless communication module, obtain identification information of the external device and a signal strength of the wireless signal from the wireless signal, identify whether the obtained signal strength corresponds to a stored signal strength pattern corresponding to the identification information of the external device, and perform an operation corresponding to the identification information of the external device, based on the obtained signal strength being identified to correspond to the stored signal strength pattern.

15 Claims, 29 Drawing Sheets

(56) References Cited

U.S. PATENT DOCUMENTS

| | | | |
|---|---|---|---|
| 8,325,019 | B2 | 12/2012 | Liu et al. |
| 9,793,981 | B2 | 10/2017 | Lee et al. |
| 9,886,604 | B2 | 2/2018 | Loussert et al. |
| 10,136,293 | B1 | 11/2018 | Rabii et al. |
| 10,332,096 | B2 * | 6/2019 | Tilahun ............... G06Q 20/3223 |
| 10,681,490 | B2 | 6/2020 | Kulkarni et al. |
| 11,425,572 | B2 | 8/2022 | Eom et al. |
| 2009/0232481 | A1 * | 9/2009 | Baalbergen ........ H04N 21/8455 386/328 |
| 2013/0335640 | A1 * | 12/2013 | Watanabe ............... G06F 3/005 348/744 |
| 2014/0055344 | A1 * | 2/2014 | Seo ....................... G06F 3/0338 345/156 |
| 2014/0279508 | A1 * | 9/2014 | Karamchedu ...... G06Q 20/4014 715/863 |
| 2015/0172289 | A1 * | 6/2015 | Kwon .................. H04W 12/122 726/3 |
| 2015/0271432 | A1 | 9/2015 | Muth |
| 2015/0278705 | A1 * | 10/2015 | Hada ..................... H04W 4/025 700/50 |
| 2016/0151672 | A1 * | 6/2016 | Barnes .................. G06Q 30/02 434/247 |
| 2017/0332190 | A1 | 11/2017 | James et al. |
| 2018/0270677 | A1 | 9/2018 | Brisebois et al. |
| 2018/0332434 | A1 | 11/2018 | Kulkarni et al. |
| 2019/0069262 | A1 | 2/2019 | Harney et al. |
| 2019/0098478 | A1 * | 3/2019 | Rabii ...................... H04W 4/42 |
| 2019/0266817 | A1 * | 8/2019 | Lucy .................. G08B 13/2491 |
| 2019/0380161 | A1 | 12/2019 | Song et al. |
| 2020/0027293 | A1 * | 1/2020 | Edwards .................. G07C 9/25 |
| 2020/0178067 | A1 | 6/2020 | Lee et al. |
| 2020/0193100 | A1 | 6/2020 | Dagdelen Uysal et al. |
| 2020/0196366 | A1 | 6/2020 | Ahn |
| 2021/0181325 | A1 | 6/2021 | Yoon |

FOREIGN PATENT DOCUMENTS

| | | |
|---|---|---|
| JP | 6474370 B2 | 2/2019 |
| KR | 100769688 B1 | 10/2007 |
| KR | 100924831 B1 | 11/2009 |
| KR | 101048518 B1 | 7/2011 |
| KR | 101514045 B1 | 4/2015 |
| KR | 101761224 B1 | 8/2017 |
| KR | 20190054456 A | 5/2019 |
| KR | 20200015296 A | 2/2020 |
| KR | 102096619 B1 | 5/2020 |
| KR | 20200045876 A | 5/2020 |
| KR | 20200064331 A | 6/2020 |
| KR | 102148645 B1 | 8/2020 |

OTHER PUBLICATIONS

Korean Office Action issued Jan. 10, 2025 in corresponding Korean Patent Application No. 10-2020-0129463.
Extended Search Report dated Jan. 3, 2024 in European Patent Application No. 21877992.4.
European Office Action issued Jul. 5, 2024 in corresponding European Patent Application No. 21877992.4.
European Office Action (Communication Pursuant to Article 94(3) EPC) dated Apr. 7, 2025, 9 pp.
European Office Action (Communication Pursuant to Article 94(3) EPC) dated Apr. 7, 2025 issued in European Patent Application No. 21877992.4, 9 pp.
Chinese Office Action dated Dec. 20, 2025 issued in Chinese Patent Application No. 202180068652.7 and English translation, 22 pp.

* cited by examiner

ELECTRONIC DEVICE AND OPERATION METHOD THEREOF

CROSS-REFERENCE TO RELATED APPLICATIONS

This application is a continuation of International Application No. PCT/KR2021/013694 designating the United States, filed on Oct. 6, 2021, in the Korean Intellectual Property Receiving Office and claiming priority to Korean Patent Application No. 10-2020-0129463, filed on Oct. 7, 2020, in the Korean Intellectual Property Office, the disclosures of which are incorporated by reference herein in their entireties.

BACKGROUND

Field

The disclosure relates to an electronic apparatus and an operating method thereof, and for example, to an electronic apparatus capable of effectively performing a wireless tag function, and an operating method thereof.

Description of Related Art

Currently, various services are being provided using wireless communication technology based on near field communication (NFC) or radio frequency identification (RFID) tags. NFC technology is characterized by enabling data transmission and reception only within a short distance of 10 cm, and thus is used for data exchange, payment, or customized services. RFID is a recognition system for reading data stored in a tag, label, or card having an embedded semiconductor chip, using a radio frequency in a non-contact manner, and is used for various services.

Wireless tagging is a technology for generating a tag event by determining proximity between devices through wireless communication without a specific tag device, and providing a service based on the generation of the tag event. In wireless tagging, proximity between two devices is determined using a wireless signal according to various wireless communication technologies, e.g., a Wi-Fi signal or a Bluetooth signal, a tag event occurs based on the determination of the proximity, and a service is provided when the tag event occurs.

As described above, for wireless tagging, the proximity between the two devices is determined using a strength of the wireless signal, and the wireless signal strength varies depending on various factors. Therefore, it may not be easy to provide reliable and satisfactory services to users by simply using the wireless tagging technology based on the wireless signal strength. Therefore, a wireless tagging technology for providing more reliable and effective services to users is required.

SUMMARY

Embodiments of the disclosure provide an electronic apparatus for creating and storing customized wireless tag information optimized for each external device, and performing a wireless tag operation suitable for the external device, using the customized wireless tag information, and an operating method thereof.

According to an example embodiment, an electronic apparatus includes: a wireless communication module comprising communication circuitry, a memory storing one or more instructions, and a processor configured to: receive a wireless signal from an external device through the wireless communication module, obtain identification information of the external device and a signal strength of the wireless signal from the wireless signal, identify whether the obtained signal strength corresponds to a stored signal strength pattern corresponding to the identification information of the external device, and perform an operation corresponding to the identification information of the external device, based on the obtained signal strength being identified to correspond to the stored signal strength pattern.

According to an example embodiment, the signal strength pattern may include a signal strength at a first timing, and a signal strength at a second timing prior to the first timing by a specified time.

According to an example embodiment, the processor may be further configured to: identify that the obtained signal strength corresponds to the stored signal strength pattern, based on the signal strength of the wireless signal at the first timing being greater than or equal to a first threshold value and the signal strength of the wireless signal at the second timing being less than or equal to a second threshold value.

According to an example embodiment, the operation corresponding to the identification information of the external device may include at least one of an audio visual content reproduction operation or an audio content reproduction operation.

According to an example embodiment, the processor may be further configured to: obtain a sensing value of the external device from the wireless signal, identify whether the obtained sensing value corresponds to a stored sensing value pattern corresponding to the identification information of the external device, and perform the operation corresponding to the identification information of the external device, based on the obtained signal strength being identified to correspond to the stored signal strength pattern and the obtained sensing value being identified to correspond to the stored sensing value pattern.

According to an example embodiment, the processor may be further configured to: pre-store, in the memory, the signal strength pattern corresponding to the identification information of the external device.

According to an example embodiment, the processor may be further configured to: receive a training wireless signal from the external device, determine the signal strength pattern, based on the received training wireless signal, and store the determined signal strength pattern in association with the identification information of the external device.

According to an example embodiment, the processor may be further configured to: receive, using an input, operation information indicating an operation to be performed based on the strength of the wireless signal received from the external device being identified to correspond to the determined signal strength pattern, and store the operation information in association with the identification information of the external device.

According to an example embodiment, the processor may be further configured to: receive, using an input, signal sensitivity information used to determine the signal strength pattern based on the training wireless signal, and determine the signal strength pattern with reference to the received signal sensitivity information.

According to an example embodiment, the processor may be further configured to: control the signal strength pattern corresponding to the identification information of the external device, to be stored in the wireless communication module.

According to an example embodiment, in a low power mode of the electronic apparatus, the wireless communication module may be configured to: receive a wireless signal from the external device, and transmit an interrupt signal to a microcomputer or the processor to trigger performance of a stored operation corresponding to the identification information of the external device, based on a signal strength obtained from the received wireless signal being identified to correspond to the stored signal strength pattern corresponding to the identification information of the external device.

According to an example embodiment, a method of operating an electronic apparatus includes: receiving a wireless signal from an external device through a wireless communication module, obtaining identification information of the external device and a signal strength of the wireless signal from the wireless signal, identifying whether the obtained signal strength corresponds to a stored signal strength pattern corresponding to the identification information of the external device, and performing an operation corresponding to the identification information of the external device, based on the obtained signal strength being identified to correspond to the stored signal strength pattern.

According to an example embodiment, a non-transitory computer-readable recording medium has recorded thereon one or more programs that, when executed by a processor of an electronic apparatus, cause the electronic apparatus to perform operations comprising: receiving a wireless signal from an external device through a wireless communication module, obtaining identification information of the external device and a signal strength of the wireless signal from the wireless signal, identifying whether the obtained signal strength corresponds to a stored signal strength pattern corresponding to the identification information of the external device, and performing an operation corresponding to the identification information of the external device, based on the obtained signal strength being identified to correspond to the stored signal strength pattern.

According to various example embodiments of the disclosure, by storing customized wireless tag information optimized for each external device, a wireless tag operation may be performed suitably for a wireless signal strength of the external device and a desired service may be registered for each device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
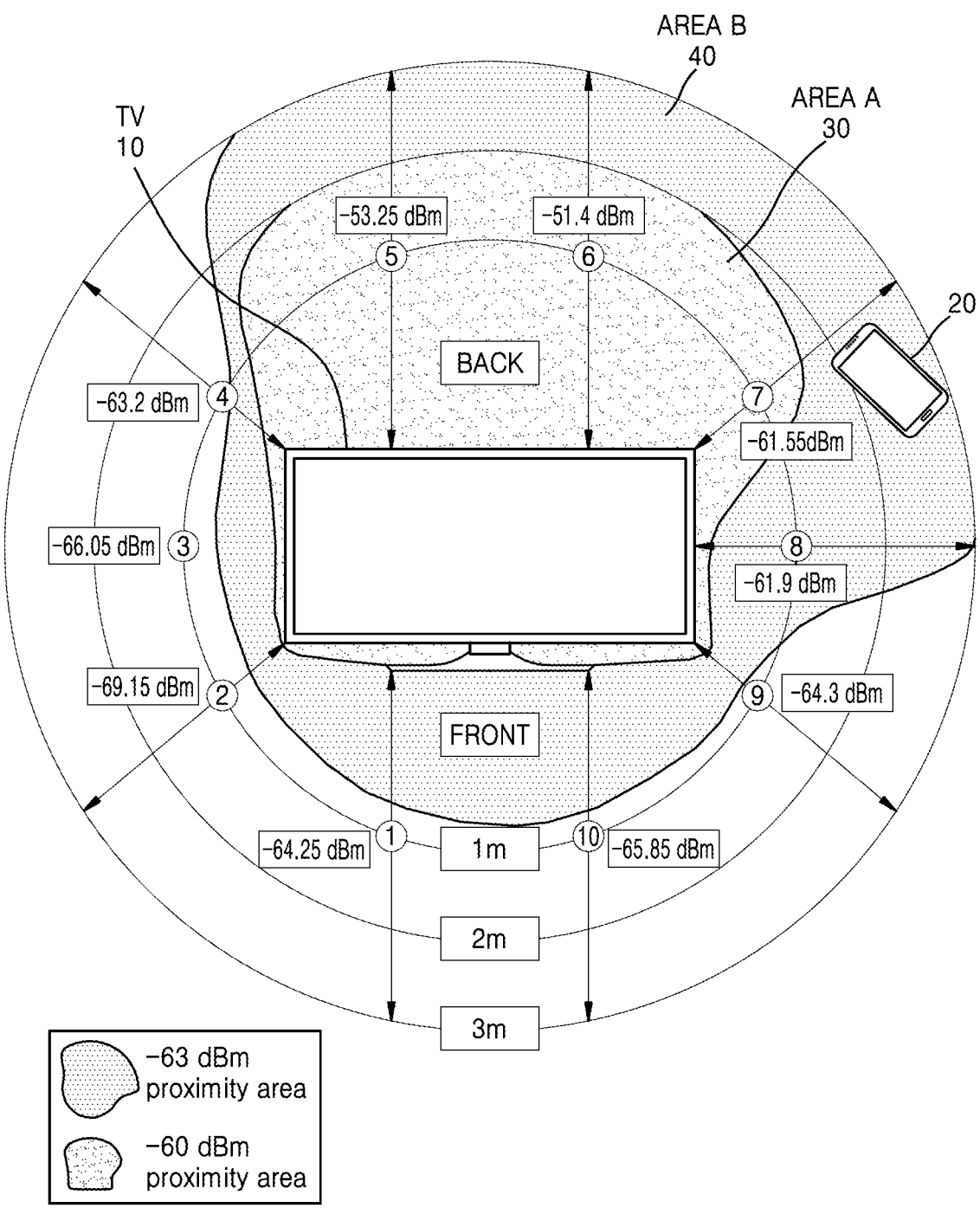
FIG. 1 is a diagram illustrating a difference in wireless signal strength depending on a distance, according to an example.

Terminology used in this disclosure will now be briefly described before describing the disclosure in greater detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Arbitrarily selected terms may be used and, in that case, the meanings of these terms may be described in relevant parts of the disclosure. Therefore, it is noted that the terms used herein are understood based on practical meanings thereof and the whole content of this disclosure, rather than being simply construed based on names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in greater detail by explaining embodiments thereof with reference to the attached drawings. The disclosure may, however, be embodied in many different forms and should not be construed as being limited to the embodiments set forth herein. In the drawings, parts not related to the disclosure may not be illustrated for clarity of explanation, and like elements are denoted by like reference numerals throughout.

As used herein, the term "user" refers to a person who controls functions or operations of a computing apparatus or an electronic apparatus using a controller, and may include a viewer, an administrator, or an installer.

FIG. 1 is a diagram illustrating a difference in wireless signal strength depending on a distance, according to an example.

Referring to FIG. 1, it is shown that, when a TV 10 detects a signal of a mobile device 20 in the vicinity of the TV 10, a strength of the wireless signal varies depending on a location of the mobile device 20. When the TV 10 detects a signal of the mobile device, a strength of the wireless signal of the mobile device detected by the TV 10 varies depending on a combination of devices, e.g., a combination of the TV 10 and the mobile device 20. For example, when a TV detects a wireless signal of a mobile device, the wireless signal exhibits a difference depending on a manufacturer and a model of the mobile device. In addition, when the same mobile device detects signals transmitted from two different types of TVs, a difference in signal strength appears depending on cases of the TVs, installation locations of Bluetooth (BT)/Wi-Fi modules, measurement directions, surrounding furniture/structures, etc.

Referring to FIG. 1, as a result of measuring Bluetooth low energy (BLE) signal strengths within 3 meters (m) from the TV 10, an area with a signal strength of −60 dBm or less is indicated as area A 30 and an area with a signal strength of −63 dBm or less is indicated as area B 40. A high signal strength is exhibited at the back of the TV 10 because an antenna of a BT module is located behind the TV 10, and signal strengths at the left and right sides of the TV 10 are not uniform. Therefore, e.g., although a user performs the same wireless tag operation, the wireless tag operation performed using the mobile device right behind the TV may be recognized by the TV, but the wireless tag operation performed in front of the TV or about 2 m to 3 m behind the TV may not be recognized by the TV 10. As described above, a wireless signal strength varies depending on devices or a measurement environment and thus, when a tag event is detected simply based on the wireless signal strength, frequent errors are unavoidable due to tagging sensitivity issues.

Figure 2:
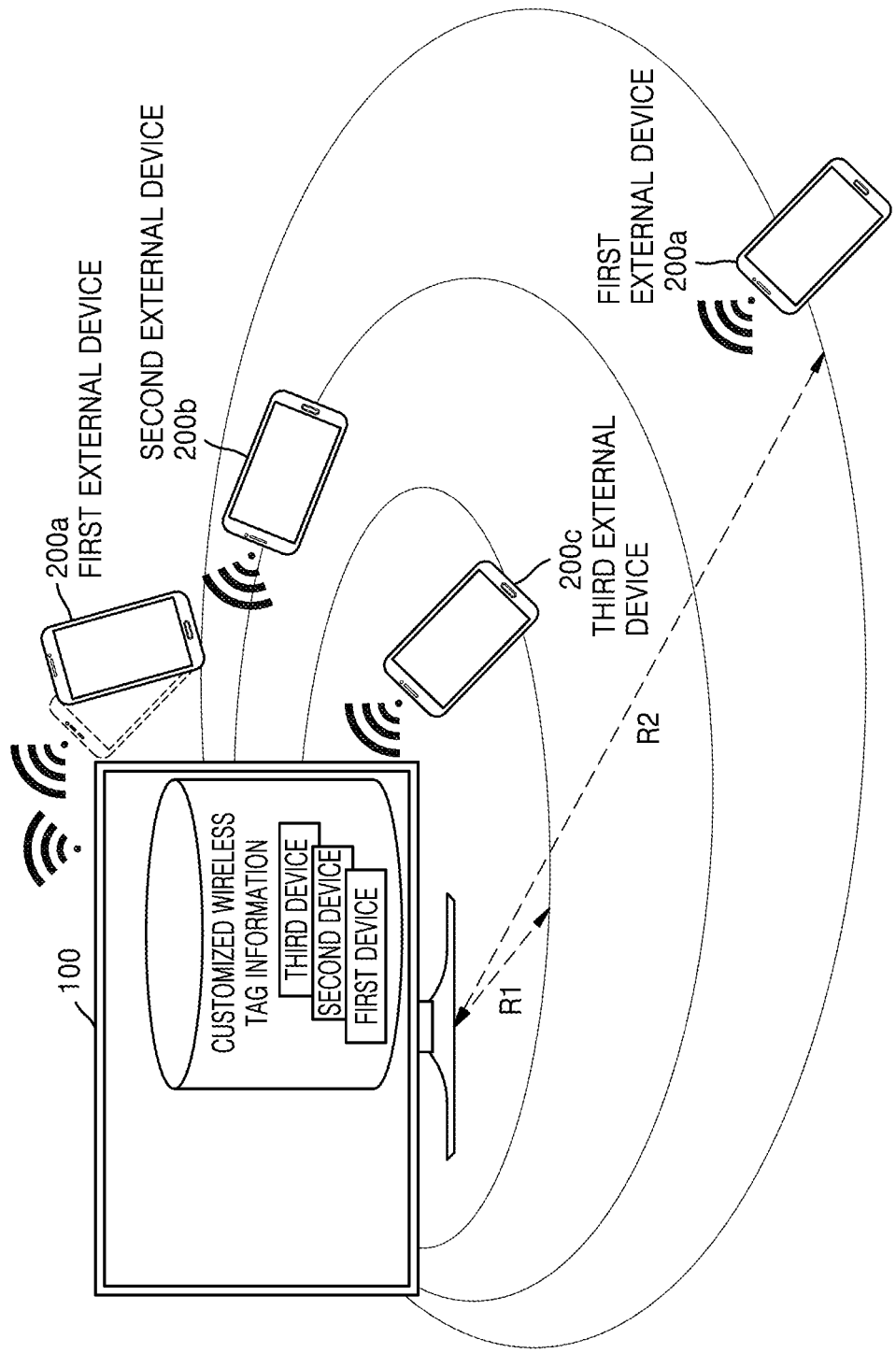
FIG. 2 is a diagram illustrating a concept in which an electronic apparatus performs a wireless tag operation by creating customized wireless tag information per device through a wireless tag training operation per device, according to various embodiments.

FIG. 2 is a diagram illustrating a concept in which an electronic apparatus performs a wireless tag operation by creating customized wireless tag information per device through a wireless tag training operation per device, according to various embodiments.

Referring to FIG. 2, an electronic apparatus 100 and one or more external devices, e.g., a first external device 200a, a second external device 200b, and a third external device 200c, are illustrated according to an example. For convenience of explanation, each of the one or more external devices may be referred to as an external device 200.

According to an embodiment, the electronic apparatus 100 may create wireless tag information customized for the external device 200 using a wireless signal received from the external device 200 for wireless tag training, and store the customized wireless tag information in a database. Differently from receiving a wireless signal based on a wireless tag operation from the external device 200 to provide a service, the "wireless tag training" may refer, for example, to an operation, performed by the electronic apparatus 100, of receiving a wireless signal based on a wireless tag operation to create wireless tag information customized for the external device 200, and creating customized wireless tag information. The "wireless tag operation" may refer, for example, to an operation of moving the external device 200 in the vicinity of the electronic apparatus 100, e.g., near or at a distance from the electronic apparatus 100, to generate a wireless signal with respect to the electronic apparatus 100. For example, the wireless tag operation may include an operation of bringing the external device 200 close to and then away from the electronic apparatus 100 near the electronic apparatus 100. The wireless tag operation may include an operation of moving the external device 200 by a certain angle toward the electronic apparatus 100 by a user at a distance from the electronic apparatus 100, e.g., by a user sitting on a sofa. Herein, the "wireless tag operation" may refer, for example, to both of a wireless tag operation for generating a wireless signal for wireless tag training to first create customized wireless tag information of the external device 200, and a wireless tag operation performed for generation of a wireless tag event to actually receive a service after the customized wireless tag information is created. The wireless signal received from the external device 200 may include a wireless signal according to various wireless communication technologies, e.g., a Bluetooth signal according to Bluetooth communication technology or a Wi-Fi signal according to Wi-Fi communication technology.

According to an embodiment, the electronic apparatus 100 may obtain identification information of the external device 200 and strength information of the wireless signal from the wireless signal received from the external device 200 for wireless tag training, and determine a signal strength pattern suitable for detecting a wireless signal of the external device 200, based on the obtained wireless signal strength. The identification information of the external device may include, for example, a media access control (MAC) address of the external device. The strength information of the wireless signal may include at least one of transmit power information and a received signal strength indicator (RSSI). According to an embodiment, the signal strength pattern may include one or more signal strength threshold values of the wireless signal and threshold values of one or more durations. For example, the signal strength pattern may include two signal strength threshold values of the wireless signal and threshold values of two durations. For example, the signal strength pattern may include a signal strength threshold value at a first timing, a signal strength threshold value at a second timing, a threshold value of a duration corresponding to the first timing, and a threshold value of a duration corresponding to the second timing in the wireless signal.

According to an embodiment, the electronic apparatus 100 may store the customized wireless tag information by storing the determined signal strength pattern in association with the identification information of the external device 200. The identification information of the external device 200 may include unique information for distinguishing the external device 200 from other external devices and may include, for example, a Bluetooth MAC address or a Wi-Fi MAC address. As described above, by storing the signal strength pattern determined with respect to the external device 200, to be mapped to the unique identification information of the external device 200, when a wireless signal based on a wireless tag operation is received from the external device 200 later, the electronic apparatus 100 may determine whether a wireless tag event occurs, with reference to <external device identification information-signal strength pattern> mapping information.

According to an embodiment, in addition to the signal strength pattern, the electronic apparatus 100 may store the customized wireless tag information by storing service information indicating a service to be provided based on generation of a wireless tag event, in association with the identification information of the external device 200. The service information indicating the service to be provided when the wireless tag event occurs based on a wireless tag operation of the external device 200 may be received using a user input. The service information indicating the service to be provided when the wireless tag event occurs may be determined in various manners. For example, the service to be provided based on the generation of the wireless tag event may include a content reproduction operation such as screen mirroring, sound mirroring, or connection of a content providing application. For example, the electronic apparatus 100 may store service information corresponding to each external device, e.g., screen mirroring as the service to be provided when the wireless tag event occurs with respect to the first external device 200a, and sound mirroring as the service to be provided when the wireless tag event occurs with respect to the second external device 200b.

According to an embodiment, the electronic apparatus 100 may store, in the database, customized wireless tag information suitable for each external device. For example, referring to FIG. 2, the electronic apparatus 100 may include, in the database, customized wireless tag information corresponding to the first external device 200a, customized wireless tag information corresponding to the second external device 200b, and customized wireless tag information corresponding to the third external device 200c. The customized wireless tag information corresponding to the first external device 200a may include identification information of the first external device 200a, a signal strength pattern used to detect a wireless tag operation of the first external device 200a, and service information indicating a service to be performed when a wireless tag event of the first external device 200a occurs. Likewise, the customized wireless tag information corresponding to the second external device 200b may include identification information of the second external device 200b, a signal strength pattern used to detect a wireless tag operation of the second external device 200b, and service information indicating a service to be performed when a wireless tag event of the second external device 200b occurs. Likewise, the electronic apparatus 100 may store the wireless tag information customized for the third external device 200c.

According to an embodiment, the electronic apparatus 100 may store a plurality of pieces of customized wireless tag information with respect to the same external device. For example, the electronic apparatus 100 receives a different wireless signal depending on a location of the first external device 200a, e.g., a location where a user performs a wireless tag operation with the first external device 200a in the vicinity of the electronic apparatus 100. For example, referring to FIG. 2, the electronic apparatus 100 may detect a strength of a wireless signal based on a wireless tag operation performed at a radius R1 by the first external device 200a, differently from a strength of a wireless signal based on a wireless tag operation performed at a radius R2 by the first external device 200a. Therefore, the electronic apparatus 100 may store a plurality of pieces of customized wireless tag information with respect to one external device by storing a wireless signal strength pattern based on each wireless tag operation using the difference in strength of the wireless signals based on the wireless tag operations performed at different locations with respect to the same external device. The electronic apparatus 100 may store the plurality of pieces of customized wireless tag information in association with different services. For example, referring to FIG. 2, the electronic apparatus 100 may store first customized wireless tag information created using the wireless signal strength based on the wireless tag operation performed at the radius R1 by the first external device 200a, and second customized wireless tag information created using the wireless signal strength based on the wireless tag operation performed at the radius R2 by the first external device 200a. Therefore, when a wireless signal is received later from the first external device 200a performing a wireless tag operation at the radius R1, the electronic apparatus 100 may provide a service according to the first customized wireless tag information, or when a wireless signal is received later from the first external device 200*a* performing a wireless tag operation at the radius R2, the electronic apparatus 100 may provide a service according to the second customized wireless tag information.

According to an embodiment, the electronic apparatus 100 may store the customized wireless tag information in further association with a sensing value pattern of the external device received from the external device. Referring to FIG. 2, when the external device performs a wireless tag operation at a location far from the electronic apparatus 100, for example, when the first external device 200*a* performs a wireless tag operation at the radius R2, a strength of a wireless signal received by the electronic apparatus 100 is inevitably low. Therefore, when the strength of the wireless signal is low, the electronic apparatus 100 may not easily determine a strength pattern of the wireless signal or identify whether the strength of the received wireless signal corresponds to the stored signal strength pattern. Thus, in this case, the electronic apparatus 100 may detect a wireless tag operation using not only the strength of the wireless signal of the external device 200 but also a sensing value of the external device 200 provided by the external device 200. For example, when the external device includes a gyro sensor and provides, to the electronic apparatus 100, a wireless signal strength and a gyro sensing value based on a wireless tag operation for wireless tag training, the electronic apparatus 100 may determine a signal strength pattern using the received wireless signal strength, determine a sensing value pattern using the received sensing value, and store the signal strength pattern and the sensing value pattern together with the customized wireless tag information corresponding to the external device. When a wireless signal strength and a sensing value based on a wireless tag operation are received later from the external device 200, the electronic apparatus 100 may determine whether a wireless tag event occurs, with reference to the signal strength pattern and the sensing value pattern stored in correspondence to the external device 200. As described above, considering not only the strength of the wireless signal based on a wireless tag operation of the external device but also the sensing value of the external device, even when the external device is far from the electronic apparatus 100 and thus the signal strength is low, the electronic apparatus 100 may more reliably determine whether a wireless tag event occurs.

According to an embodiment, the electronic apparatus 100 may provide a graphical user interface for inducing a wireless tag training operation to store customized wireless tag information, and store the customized wireless tag information corresponding to the external device, when a wireless signal based on a wireless tag operation of the external device is received in response to the graphical user interface. According to an embodiment, to store the customized wireless tag information, the electronic apparatus 100 may receive, using a user input, service information indicating a service to be performed in correspondence to generation of a wireless tag event of the external device, and store the service information in association with the identification information of the external device. According to an embodiment, to store the customized wireless tag information, the electronic apparatus 100 may receive, using a user input, sensitivity information of the signal strength pattern used to determine whether a wireless tag event occurs, and determine the signal strength pattern using the received sensitivity information.

According to an embodiment, when a wireless signal based on a wireless tag operation is received from the external device 200, the electronic apparatus 100 may obtain identification information the external device and a wireless signal strength from the received wireless signal, searches for the identification information the external device in the database storing the customized wireless tag information, and determine whether a wireless tag event occurs, using the customized wireless tag information corresponding to the identification information of the external device, when the identification information the external device is found in the database. The electronic apparatus 100 may determine whether the received wireless signal strength corresponds to a stored signal strength pattern, using the signal strength pattern stored in association with the identification information of the external device, and provide a service mapped to the identification information of the external device, when the received wireless signal strength corresponds to the stored signal strength pattern. When it is determined that the received wireless signal strength does not correspond to the stored signal strength pattern, the electronic apparatus 100 may not perform any operation in correspondence to the reception of the wireless signal from the external device. According to an embodiment, when the identification information of the external device which has transmitted the wireless signal is not found in the database storing the customized wireless tag information, the electronic apparatus 100 may determine whether a wireless tag event occurs, by determining whether the received wireless signal strength corresponds to a signal strength pattern stored by default.

According to an embodiment, the electronic apparatus 100 may store the customized wireless tag information not only in a memory referred by an application processor but also in a memory of a wireless communication module which operates even in a sleep mode (or a standby mode or a low power mode) of the electronic apparatus 100, and update the customized wireless tag information. As described above, by recording the customized wireless tag information on the memory of the wireless communication module which is powered on even in the sleep mode of the electronic apparatus 100, even when a wireless signal based on a wireless tag operation of the external device is received in the sleep mode of the electronic apparatus 100, the electronic apparatus 100 may determine whether a wireless tag event occurs, by comparing the received wireless signal to a signal strength pattern stored in the customized wireless tag information. When it is determined that a wireless tag event occurs based on the received wireless signal, the electronic apparatus 100 may wake up an application processor and transition to a normal mode (or a power on mode) to provide a service based on the generated wireless tag event.

Figure 3:
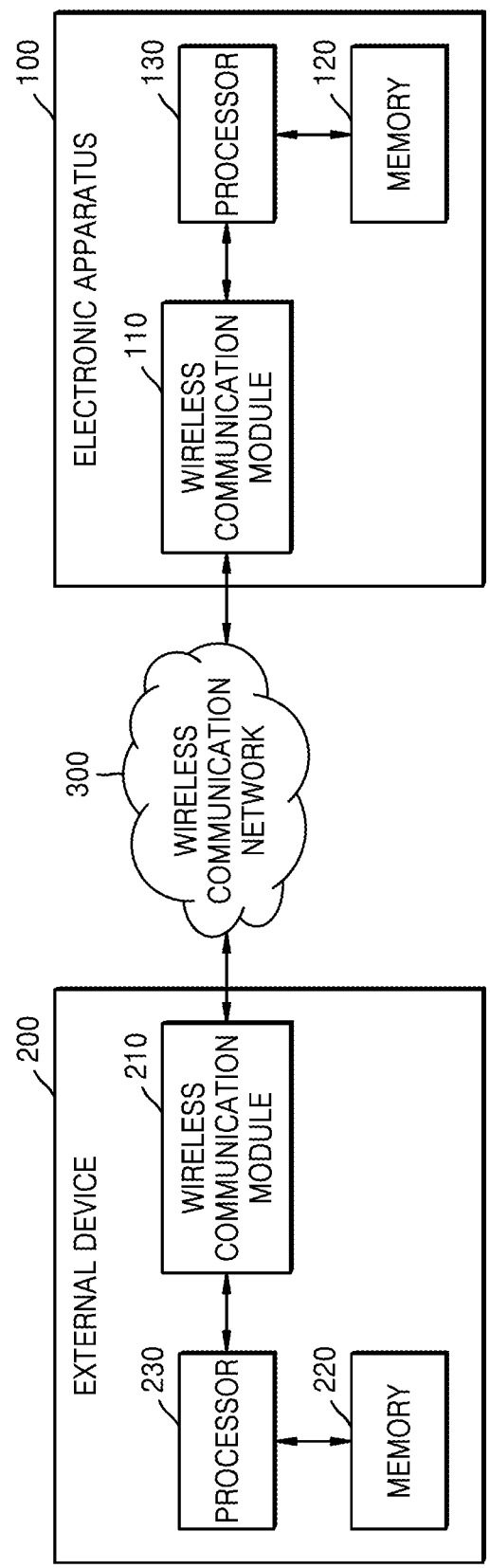
FIG. 3 is a block diagram illustrating an example configuration of a system including an electronic apparatus and an external device, according to various embodiments.

FIG. 3 is a block diagram illustrating an example configuration of a system including an electronic apparatus and an external device, according to various embodiments.

Referring to FIG. 3, the system may include the electronic apparatus 100, the external device 200, and a wireless communication network 300. The external device 200 may transmit a wireless signal based on a wireless tag operation to the electronic apparatus 100 through the wireless communication network 300, and the electronic apparatus 100 may generate a wireless tag event based on the wireless signal received through the wireless communication network 300, and perform an operation related to a service corresponding to the wireless tag event.

The electronic apparatus 100 may include a wireless communication module (e.g., including communication circuitry) 110, a memory 120, and a processor (e.g., including processing circuitry) 130. However, the electronic apparatus 100 may be implemented by more elements than the illustrated elements, and is not limited to the above-described example.

According to an embodiment, the wireless communication module 110 may include various communication circuitry and communicate with the external device 200 through the wireless communication network 300. For example, the wireless communication module 110 may include at least one of a Wi-Fi communication module or a Bluetooth communication module.

According to an embodiment, the wireless communication module 110 may receive a wireless signal from the external device 200 through the wireless communication network 300, obtain identification information of the external device and strength information of the wireless signal from the received wireless signal, and transmit the obtained identification information of the external device and the strength information of the wireless signal to the processor 130. The identification information of the external device may include, for example, a MAC address of the external device. The strength information of the wireless signal may include at least one of transmit power information and a RSSI.

The memory 120 according to an embodiment may store programs for processing and control by the processor 130, and also store data input to or to be output from the electronic apparatus 100.

The memory 120 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, or an optical disc.

The processor 130 may include various processing circuitry and controls overall operation of the electronic apparatus 100. For example, the processor 130 may execute one or more instructions stored in the memory 120 to perform functions of the electronic apparatus 100 disclosed herein.

In an embodiment of the disclosure, the processor 130 may execute the one or more instructions stored in the memory 120 to control the above-described operations to be performed. In this case, the memory 120 may store one or more instructions executable by the processor 130.

In an embodiment of the disclosure, the processor 130 may store one or more instructions in an internal memory, and execute the one or more instructions stored in the internal memory to control the above-described operations to be performed. That is, the processor 130 may execute at least one instruction or program stored in the memory 120 or the internal memory of the processor 130 to perform a certain operation.

Although FIG. 3 illustrates one processor 130, a plurality of processors may be provided. In this case, each of operations performed in the electronic apparatus according to an embodiment of the disclosure may be performed by at least one of the plurality of processors.

According to an embodiment, the processor 130 may execute the one or more instructions stored in the memory 120 to determine a signal strength pattern based on a training wireless signal used for wireless tag training, when the training wireless signal is received from the external device 200, and store the determined signal strength pattern in association with the identification information of the external device.

According to an embodiment, the processor 130 may execute the one or more instructions stored in the memory 120 to store, in association with the identification information of the external device, service operation information indicating a service operation to be performed based on a strength of the wireless signal received from the external device being identified to correspond to the determined signal strength pattern.

According to an embodiment, the processor 130 may execute the one or more instructions stored in the memory 120 to receive, using a user input, signal sensitivity information used to determine the signal strength pattern based on the training wireless signal, and determine the signal strength pattern with reference to the received signal sensitivity information.

According to an embodiment, the processor 130 may execute the one or more instructions stored in the memory 120 to receive a wireless signal from the external device through the wireless communication module, obtain identification information of the external device and a signal strength of the wireless signal from the wireless signal, identify whether the obtained signal strength corresponds to a signal strength pattern (or requirement) stored in correspondence to the identification information of the external device, and perform an operation corresponding to the identification information of the external device based on the obtained signal strength being identified to correspond to the stored signal strength pattern, that is, based on the obtained signal strength being identified to satisfy the signal strength requirement.

According to an embodiment, the signal strength pattern may include a signal strength at a first timing, and a signal strength at a second timing prior to the first timing by a predefined time.

According to an embodiment, the processor 130 may execute the one or more instructions stored in the memory 120 to identify that the obtained signal strength corresponds to the stored signal strength pattern, based on the signal strength of the wireless signal at the first timing being greater than or equal to a first threshold value and the signal strength of the wireless signal at the second timing being less than or equal to a second threshold value.

According to an embodiment, the operation corresponding to the identification information of the external device may include at least one of an audio visual content reproduction operation or an audio content reproduction operation.

According to an embodiment, the processor 130 may execute the one or more instructions stored in the memory 120 to obtain a sensing value of the external device from the wireless signal, identify whether the obtained sensing value corresponds to a sensing value pattern stored in correspondence to the identification information of the external device, and perform the operation corresponding to the identification information of the external device, based on the obtained signal strength being identified to correspond to the stored signal strength pattern, and also the obtained sensing value being identified to correspond to the stored sensing value pattern.

According to an embodiment, the processor 130 may execute the one or more instructions stored in the memory 120 to pre-store, in the memory, the signal strength pattern corresponding to the identification information of the external device.

According to an embodiment, the processor 130 may execute the one or more instructions stored in the memory 120 to control the signal strength pattern corresponding to the identification information of the external device, to be stored in the wireless communication module 110.

According to an embodiment, in a low power mode of the electronic apparatus, the wireless communication module 110 may receive a wireless signal from the external device, and transmit an interrupt signal to the processor 130 to trigger performance of an operation stored in correspondence to identification information of the external device, based on a signal strength obtained from the received wireless signal being identified to correspond to a signal strength pattern stored in correspondence to the identification information of the external device.

The electronic apparatus 100 may be any type of apparatus including a processor and a memory to perform functions. The electronic apparatus 100 may be a stationary or mobile apparatus. For example, the electronic apparatus 100 may include various electronic apparatuses, e.g., computers such as desktops, laptops, and tablets, televisions, set-top boxes, smartphones, cellular phones, game consoles, music players, video players, medical devices, and home appliances. The electronic apparatus 100 may also be referred to as a display apparatus, a computing apparatus, or a media apparatus.

The external device 200 may include a wireless communication module (e.g., including communication circuitry) 210, a memory 220, and a processor (e.g., including processing circuitry) 230. However, the external device 200 may be implemented by more elements than the illustrated elements, and is not limited to the above-described example.

According to an embodiment, the wireless communication module 210 may include various communication circuitry and communicate with the electronic apparatus 100 through the wireless communication network 300. For example, the wireless communication module 210 may include at least one of a Wi-Fi communication module or a Bluetooth communication module.

According to an embodiment, the wireless communication module 210 may transmit or receive a wireless signal to or from the electronic apparatus 100 through the wireless communication network 300. The wireless signal may include at least one of a Wi-Fi signal or a Bluetooth signal. For example, the wireless signal may include identification information of the external device 200 and strength information of the wireless signal. The identification information of the external device may include, for example, a MAC address of the external device. The strength information of the wireless signal may include at least one of transmit power information and a RSSI. As another example, the wireless signal may include the identification information of the external device 200, the strength information of the wireless signal, and a sensing value obtained by the external device 200.

According to an embodiment, the wireless communication module 210 may transmit a wireless signal including information about content reproduced by the external device 200, based on a request of the electronic apparatus 100.

The memory 220 according to an embodiment may store programs for processing and control by the processor 230, and also store data input to or to be output from the external device 200.

The memory 220 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, or an optical disc.

The processor 230 may include various processing circuitry and controls overall operation of the external device 200. For example, the processor 230 may execute one or more instructions stored in the memory 220 to perform functions of the external device 200 disclosed herein.

In an embodiment of the disclosure, the processor 230 may execute the one or more instructions stored in the memory 220 to control the above-described operations to be performed. In this case, the memory 220 may store one or more instructions executable by the processor 230.

In an embodiment of the disclosure, the processor 230 may store one or more instructions in an internal memory, and execute the one or more instructions stored in the internal memory to control the above-described operations to be performed. That is, the processor 230 may execute at least one instruction or program stored in the memory 220 or the internal memory of the processor 230 to perform a certain operation.

Although FIG. 3 illustrates one processor 230, a plurality of processors may be provided. In this case, each of operations performed in the external device according to an embodiment of the disclosure may be performed by at least one of the plurality of processors.

Figure 4:
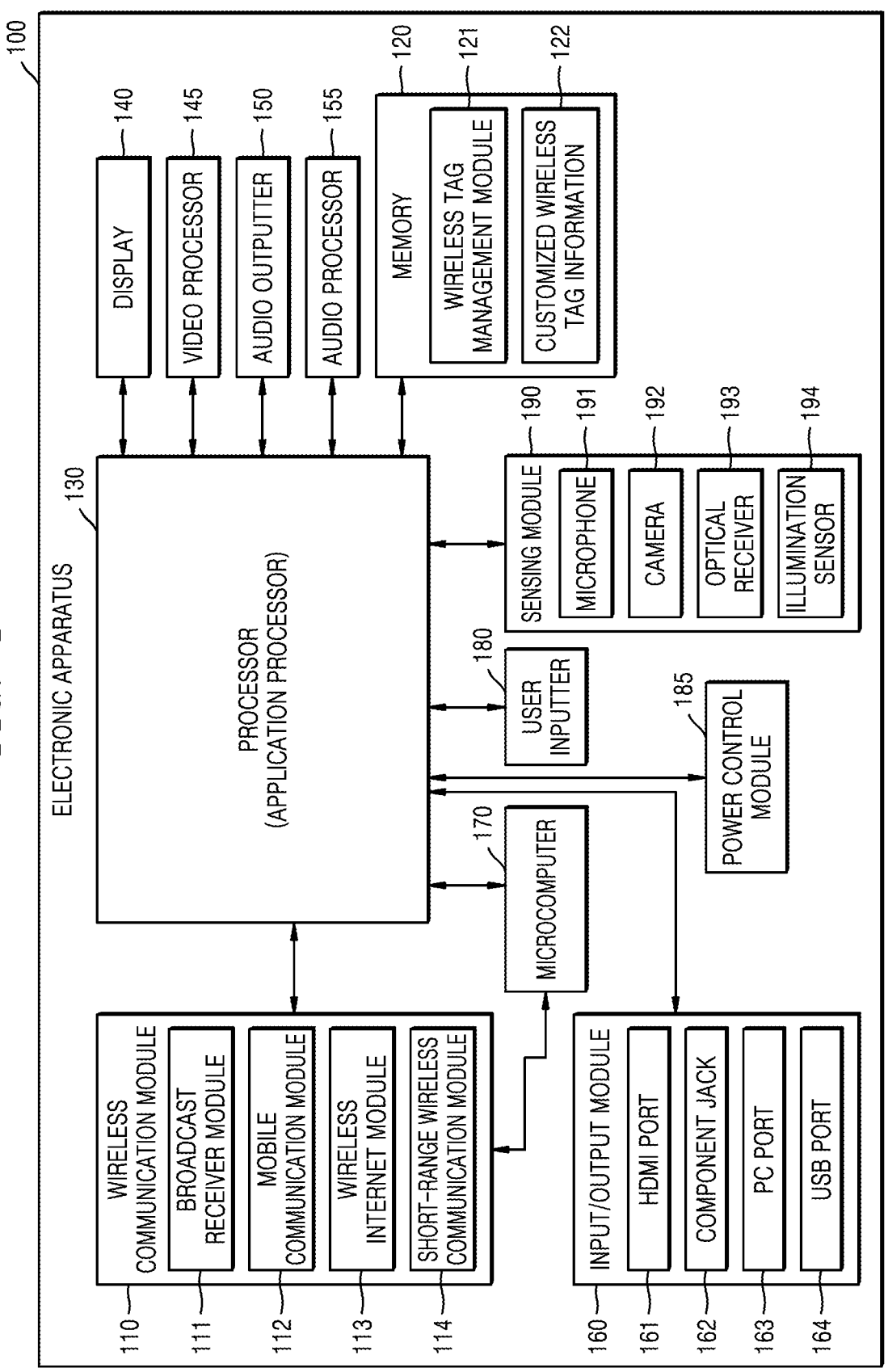
FIG. 4 is a block diagram illustrating an example configuration of an electronic apparatus according to various embodiments.

FIG. 4 is a block diagram illustrating an example configuration of an electronic apparatus according to various embodiments.

In FIGS. 3 and 4, like elements are denoted by like reference numerals. Therefore, the description provided above in relation to FIG. 3 may not be repeated herein to describe the electronic apparatus 100.

Referring to FIG. 4, in addition to the wireless communication module (e.g., including communication circuitry) 110, the memory 120, and the processor (e.g., including processing circuitry) 130, the electronic apparatus 100 may further include a display 140, an audio outputter (e.g., including audio output circuitry) 150, a microcomputer (micom, e.g., including processing circuitry) 170, a power control module (e.g., including power control circuitry) 185, a sensing module (e.g., including at least one sensor) 190, and an input/output module (e.g., including input/output circuitry) 160. The processor 130 may control each element of the electronic apparatus 100 to perform an operation.

The description of the memory 120 and the processor 130 provided above in relation to FIG. 3 and may not be repeated in relation to FIG. 4.

The wireless communication module 110 may include various communication circuitry including one or more modules capable of enabling wireless communication between the electronic apparatus 100 and a wireless communication system or between the electronic apparatus 100 and a network where another electronic apparatus is located. For example, the wireless communication module 110 may include a broadcast receiver module 111, a mobile communication module 112, a wireless Internet module 113, and a short-range wireless communication module 114. The wireless communication module 110 may be called a transceiver.

The broadcast receiver module 111 may include various circuitry and receives broadcast signals and/or broadcast information from an external broadcast management server through broadcast channels. The broadcast signals may not only include TV broadcast signals, radio broadcast signals, and data broadcast signals but also include broadcast signals in which TV or radio broadcast signals are combined with data broadcast signals.

The mobile communication module 112 may include various circuitry and transmits or receives wireless signals to or from at least one of a base station, an external terminal, or a server on a mobile communication network. The wireless signals may include various types of data based on transmission and reception of voice call signals, video call signals, or text/multimedia messages.

The wireless Internet module 113 may include various circuitry and refers to a module for wireless Internet access, and may be included in or provided outside a device. As wireless Internet technology, for example, wireless local area network (WLAN) (or Wi-Fi), wireless broadband (Wibro), worldwide interoperability for microwave access (Wimax), or high-speed downlink packet access (HSDPA) may be used. The device may be Wi-Fi peer-to-peer (P2P)-connected to another device through the wireless Internet module 113.

According to an embodiment, the wireless Internet module 113 may include a Wi-Fi module performing Wi-Fi communication, and a wireless signal based on a wireless tag operation may be received from the external device 200 through the Wi-Fi module.

The short-range wireless communication module 114 may include various circuitry and refers to a module for short-range wireless communication. As short-range wireless communication technology, for example, Bluetooth, Bluetooth low energy (BLE), radio frequency identification (RFID), Infrared Data Association (IrDA), ultra-wideband (UWB), or ZigBee may be used.

According to an embodiment, the short-range wireless communication module 114 may include a Bluetooth module performing Bluetooth communication, and a wireless signal based on a wireless tag operation may be received from the external device 200 through the Bluetooth module.

The above-described Wi-Fi and Bluetooth modules may be configured as separate chips, or configured as one chip, e.g., a Wi-Fi/Bluetooth combo module.

The display 140 may display an image on a screen under the control of the processor 130. The image displayed on the screen may be received from the wireless communication module 100, the input/output module 160, or the memory 120.

A video processor 145 may include various video processing circuitry and process image data to be displayed by the display 130, and perform various image processing operations, e.g., decoding, rendering, scaling, noise filtering, frame rate conversion, and resolution conversion, on the image data.

The audio outputter 150 may include various audio output circuitry and output audio included in a received broadcast signal, audio input through the wireless communication module 110 or the input/output module 160, or audio stored in the memory 120, under the control of the processor 130. The audio outputter 150 may include at least one of a speaker, a headphone output port, or a Sony/Philips Digital Interface (S/PDIF) output port.

An audio processor 155 may include various audio processing circuitry and processes audio data. The audio processor 155 may perform various processing operations, e.g., decoding, amplification, and noise filtering, on the audio data.

The input/output module 160 may include various input/output circuitry and receives, for example, video data (e.g., moving images), audio data (e.g., voice or music), and additional information (e.g., an electronic program guide (EPG)) from the outside of the electronic apparatus 100 under the control of the processor 130. The input/output module 160 may include one of a high-definition multimedia interface (HDMI) port 161, a component jack 162, a personal computer (PC) port 163, and a universal serial bus (USB) port 164. The input/output module 160 may include a combination of the HDMI port 161, the component jack 162, the PC port 163, and the USB port 164.

The microcomputer (e.g., micom) 170 may include a processor which always receives power supply even in a standby mode to wake up an application processor, and serves to wake up the processor 130 when, for example, a control signal is received from a remote controller.

A user inputter 180 may include various user input circuitry and refers to means by which a user inputs data for controlling the electronic apparatus 100. For example, the user inputter 180 may include a keypad, a dome switch, a touchpad, a jog wheel, or a jog switch, but is not limited thereto.

The sensing module 190 may include at least one sensor and detect voice of a user, a video of the user, or an interaction of the user, and include a microphone 191, a camera 192, and an optical receiver 193. The microphone 191 may receive voice uttered by the user, convert the received voice into an electrical signal, and output the electrical signal to the processor 130. The camera 192 may receive a video (e.g., consecutive frames) corresponding to motion of the user which includes a gesture within a camera recognition range. The optical receiver 193 receives an optical signal (including a control signal) from the remote controller. The optical receiver 193 may receive, from the remote controller, an optical signal corresponding to a user input (e.g., touch, press, touch gesture, voice, or motion). A control signal may be extracted from the received optical signal under the control of the processor 130. An illumination sensor 194 may detect a brightness signal. According to an embodiment, the brightness signal value from the illumination sensor 194 may be used to determine a wireless tag operation of the external device together with a wireless signal value received from the external device.

The memory 110 according to an embodiment may store programs (e.g., modules) for processing and control by the processor 120, and also store data input to or to be output from the electronic apparatus 100. In addition, the memory 110 may store data required for operation of the electronic apparatus 100.

The programs stored in the memory 110 may be classified into a plurality of modules depending on functions thereof.

According to an embodiment, the memory 120 may include a wireless tag management module 121 and a customized wireless tag information 122.

According to an embodiment, the wireless tag management module 121 may include one or more instructions for determining a signal strength pattern suitable for a training wireless signal when the training wireless signal is received from the external device 200, creating customized wireless tag information corresponding to the external device 200, and storing the created customized wireless tag information in a database.

According to an embodiment, the wireless tag management module 121 may include one or more instructions for extracting customized wireless tag information of the external device 200 from the database when a wireless tag signal for generation of a wireless tag event is received from the external device 200, identifying whether a received wireless signal corresponds to the stored signal strength pattern, using a signal strength pattern of the extracted wireless tag information, and performing a service operation stored to be mapped to the external device 200, based on the received wireless signal being identified to correspond to the stored signal strength pattern.

According to an embodiment, the customized wireless tag information 122 may include information used to perform a wireless tag operation in correspondence to each external device.

According to an embodiment, the customized wireless tag information 122 may include a signal strength pattern serving as a criterion for determining whether a wireless signal corresponds to a signal capable of generating a wireless tag event when the wireless signal and identification information of the external device are received, and service information indicating a service to be performed when it is determined that a wireless tag event occurs based on the received wireless signal.

According to an embodiment, in addition to the identification information of the external device, the signal strength pattern, and the service information, the customized wireless tag information 122 may further include a sensing pattern of the external device. The sensing pattern may be a factor serving as a criterion for determining whether a wireless tag event occurs, considering not only a signal strength value of the received wireless signal but also a sensing value transmitted from the external device.

Although the wireless tag management module 121 is implemented as software stored in the memory 120 in FIG. 4, the wireless tag management module 121 is not limited thereto and may be implemented as a combination of suitable software, logic, circuit, interface, and/or code which may operate to perform a wireless tag function disclosed herein.

The processor 130 may include various processing circuitry and controls overall operation of the electronic apparatus 100 and the flow of signals between internal elements of the electronic apparatus 100, and processes data. The processor 130 may execute an operating system (OS) and various applications stored in the memory 120, when an input of the user is received or a preset and stored condition is satisfied.

The processor 130 may include an internal memory. In this case, at least one of data, programs, and instructions to be stored in the memory 120 may be stored in the internal memory (not shown) of the processor 130.

Meanwhile, the block diagrams of the electronic apparatus 100 shown in FIGS. 3 and 4 are block diagrams for an embodiment. Elements of the block diagram may be integrated, added, or omitted depending on specifications of the electronic apparatus 100 which is actually realized. For example, when necessary, two or more elements may be combined into one element, or one element may be divided into two or more elements. The functions performed by the blocks are to describe embodiments, and specific operations or devices thereof do not limit the scope of the disclosure.

Figure 5:
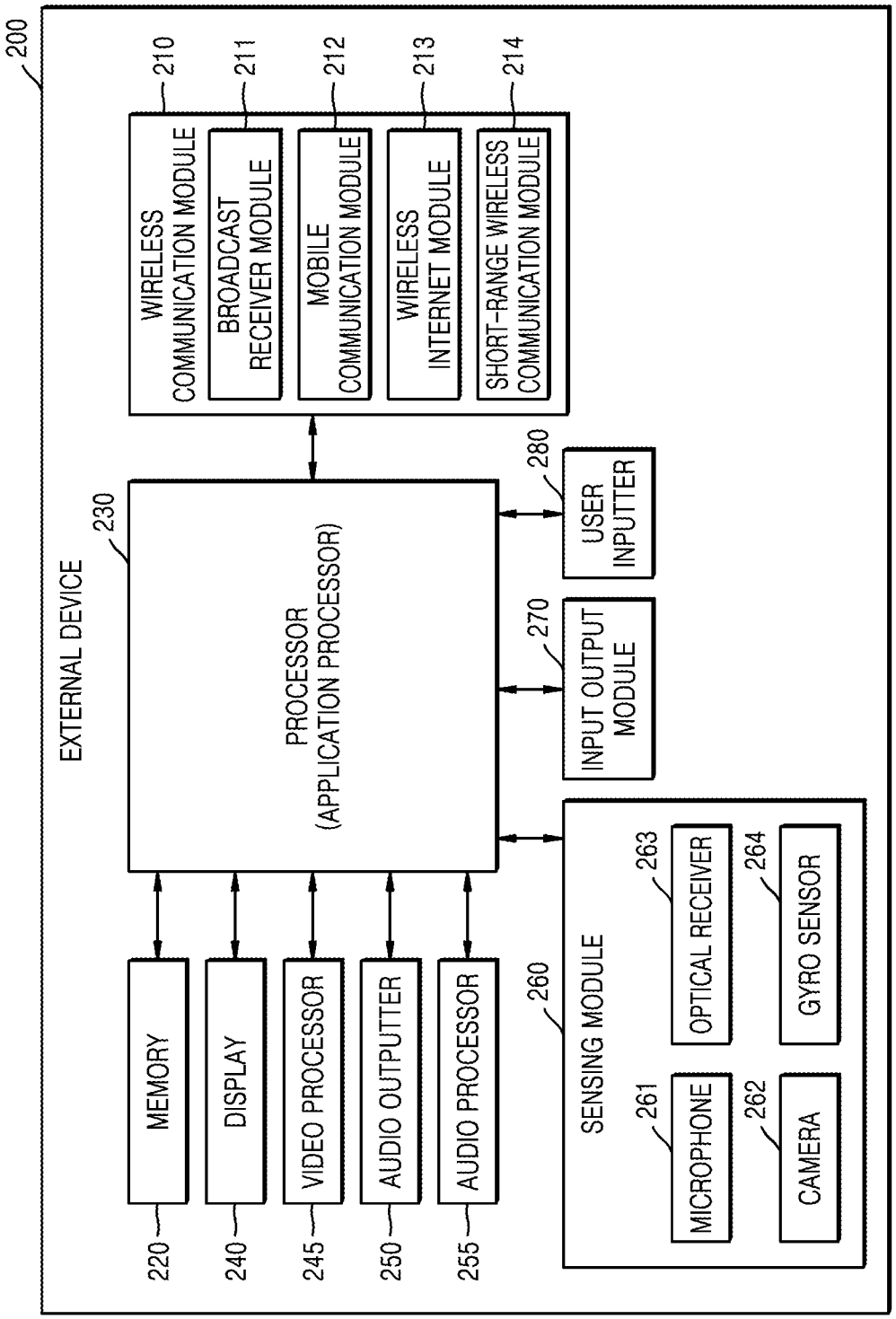
FIG. 5 is a block diagram illustrating an example configuration of an external device according to various embodiments.

FIG. 5 is a block diagram illustrating an example configuration of an external device according to various embodiments.

In FIGS. 3 and 5, like elements are denoted by like reference numerals. Therefore, the description provided above in relation to FIG. 3 may not be repeated herein to describe the external device 200.

Referring to FIG. 5, in addition to the wireless communication module (e.g., including communication circuitry) 210, the memory 220, and the processor (e.g., including processing circuitry) 230, the external device 200 may further include a display 240, a video processor (e.g., including video processing circuitry) 245, an audio outputter (e.g., including audio output circuitry) 250, an audio processor (e.g., including audio processing circuitry) 255, a sensing module (e.g., including at least one sensor) 260, an input/output module (e.g., including input/output circuitry) 270, and a user inputter (e.g., including input circuitry) 280.

The description of the memory 220 and the processor 230 provided above in relation to FIG. 3 may not be repeated in relation to FIG. 5.

The wireless communication module 210 may include various communication circuitry including one or more modules capable of enabling wireless communication between the external device 200 and a wireless communication system or between the external device 200 and a network where another electronic apparatus is located. For example, the wireless communication module 210 may include a broadcast receiver module 211, a mobile communication module 212, a wireless Internet module 213, and a short-range wireless communication module 214. The wireless communication module 210 may be called a transceiver.

The wireless Internet module 213 refers to a module for wireless Internet access, and may be included in or provided outside a device. As wireless Internet technology, for example, WLAN (or Wi-Fi), Wibro, Wimax, or HSDPA may be used. The device may be Wi-Fi P2P-connected to another device through the wireless Internet module 213.

According to an embodiment, the wireless Internet module 213 may include a Wi-Fi module performing Wi-Fi communication, and a wireless signal based on a wireless tag operation may be transmitted to or received from the electronic apparatus 100 through the Wi-Fi module.

The short-range wireless communication module 214 refers to a module for short-range wireless communication. As short-range wireless communication technology, for example, Bluetooth, BLE, RFID, IrDA, UWB, or ZigBee may be used.

According to an embodiment, the short-range wireless communication module 214 may include a Bluetooth module performing Bluetooth communication, and a wireless signal based on a wireless tag operation may be transmitted to or received from the electronic apparatus 100 through the Bluetooth module.

The above-described Wi-Fi and Bluetooth modules may be configured as separate chips, or configured as one chip, e.g., a Wi-Fi/Bluetooth combo module.

The display 240 may display an image on a screen under the control of the processor 230. The image displayed on the screen may be received from the wireless communication module 210, the input/output module 270, or the memory 220.

The video processor 245 may include various circuitry and process image data to be displayed by the display 240, and perform various image processing operations, e.g., decoding, rendering, scaling, noise filtering, frame rate conversion, and resolution conversion, on the image data.

The audio outputter 250 may include various audio output circuitry and output audio included in a received broadcast signal, audio input through the wireless communication module 210 or the input/output module 270, or audio stored in the memory 220, under the control of the processor 230. The audio outputter 250 may include at least one of a speaker, a headphone output port, or a S/PDIF output port.

The audio processor 255 may include various audio processing circuitry and processes audio data. The audio processor 255 may perform various processing operations, e.g., decoding, amplification, and noise filtering, on the audio data.

The sensing module 260 may include at least one sensor and detect voice of a user, a video of the user, or an interaction of the user, and include a microphone 261, a camera 262, and an optical receiver 263. The microphone 261, the camera 262, and the optical receiver 263 are the same as or similar to the microphone 191, the camera 192, and the optical receiver 193 described above in relation to FIG. 4.

A gyro sensor 264 may include a sensor for detecting motion of an object using a gyroscope, an inertial sensor, and an acceleration sensor. A sensing value representing motion of the external device 200, which is detected by the gyro sensor 264, may be transmitted to the electronic apparatus 100 through the wireless communication module under the control of the processor 230. The sensing value measured by the gyro sensor 264 may be transmitted as a Bluetooth signal or a Wi-Fi signal.

The input/output module 270 may include various input/output circuitry and receives, for example, video data (e.g., moving images), audio data (e.g., voice or music), and additional information (e.g., an EPG) from the outside of the external device 200 under the control of the processor 230. The input/output module 270 may include one of a HDMI port, a component jack, a PC port, and a USB port.

The user inputter 280 may include various input circuitry and refers to means by which a user inputs data for controlling the external device 200. For example, the user inputter 280 may include a keypad, a dome switch, a touchpad, a jog wheel, or a jog switch, but is not limited thereto.

The memory 220 according to an embodiment may store programs for processing and control by the processor 230, and also store data input to or to be output from the external device 200. In addition, the memory 220 may store data required for operation of the external device 200.

The programs stored in the memory 220 may be classified into a plurality of modules depending on functions thereof.

The processor 230 may include various processing circuitry and controls overall operation of the external device 200 and the flow of signals between internal elements of the external device 200, and processes data. The processor 230 may execute an OS and various applications stored in the memory 220, when an input of the user is received or a preset and stored condition is satisfied.

The processor 230 may include an internal memory. In this case, at least one of data, programs, and instructions to be stored in the memory 220 may be stored in the internal memory (not shown) of the processor 230.

According to an embodiment, the processor 230 may control a wireless signal to be transmitted through the wireless communication module 210. In this case, the user holds the external device 200 and performs a wireless tag operation, that is, the user holds the external device 200 and performs an operation of bringing the external device 200 close to and then away from the electronic apparatus 100, and a strength given to the wireless signal by the external device 200 may vary depending on such an operation.

According to an embodiment, when the electronic apparatus 100 determines that a wireless tag event occurs and when a request predetermined to provide a service corresponding to the generation of the wireless tag event is received from the electronic apparatus 100, the processor 230 may control the wireless communication module 210 to transmit information based on the request to the electronic apparatus 100. For example, when the service corresponding to the generation of the wireless tag event is screen mirroring or sound mirroring, the processor 230 may provide, to the electronic apparatus 100, information about audio visual content or audio content being reproduced on the external device 200.

Meanwhile, the block diagrams of the external device 200 shown in FIGS. 3 and 5 are block diagrams illustrating various embodiments. Elements of the block diagram may be integrated, added, or omitted depending on specifications of the external device 200 which is actually realized. For example, when necessary, two or more elements may be combined into one element, or one element may be divided into two or more elements. The functions performed by the blocks are to describe embodiments, and specific operations or devices thereof do not limit the scope of the disclosure.

Figure 6:
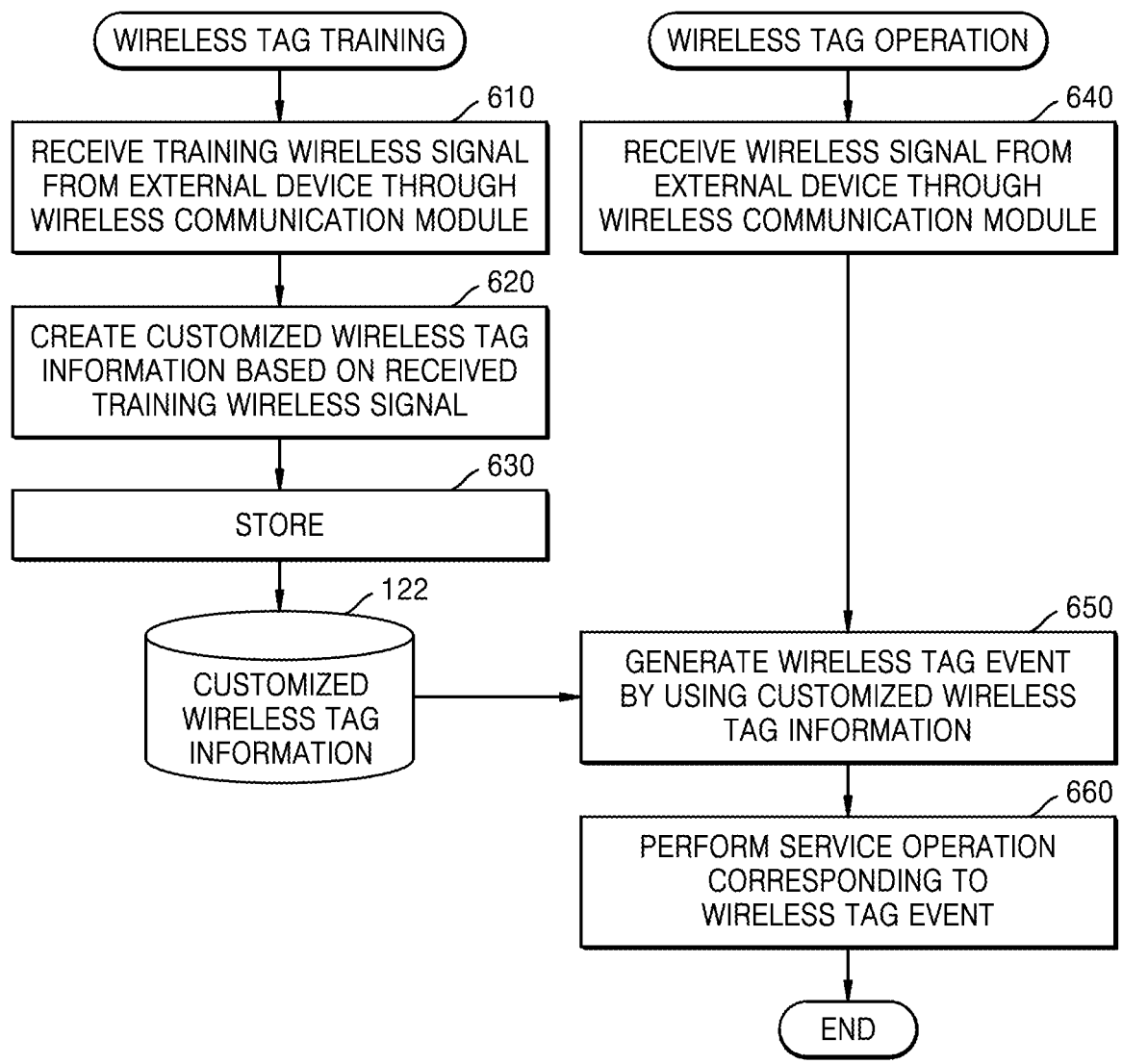
FIG. 6 is a flowchart illustrating an example operation for executing a wireless tag function, according to various embodiments.

FIG. 6 is a flowchart illustrating an example overall operation for executing a wireless tag function, according to various embodiments.

To provide a wireless tag function customized for each external device according to embodiments of the disclosure, the electronic apparatus 100 may store customized wireless tag information through wireless tag training per external device, and provide a service by determining a wireless signal based on an actual wireless tag operation using the customized wireless tag information when the wireless signal is received.

Referring to FIG. 6, in operation 610, the electronic apparatus 100 may receive a training wireless signal from an external device through a wireless communication module.

In operation 620, the electronic apparatus 100 may create a customized wireless tag information based on the received training wireless signal.

In operation 630, the electronic apparatus 100 may store the created customized wireless tag information in a database.

In operation 640, the electronic apparatus 100 may receive a wireless signal from the external device through the wireless communication module.

In operation 650, the electronic apparatus 100 may generate a wireless tag event using the customized wireless tag information.

In operation 660, the electronic apparatus 100 may perform a service operation corresponding to the wireless tag event.

The wireless tag training operation will now be described in greater detail below with reference to FIGS. 7 to 21.

Figure 7:
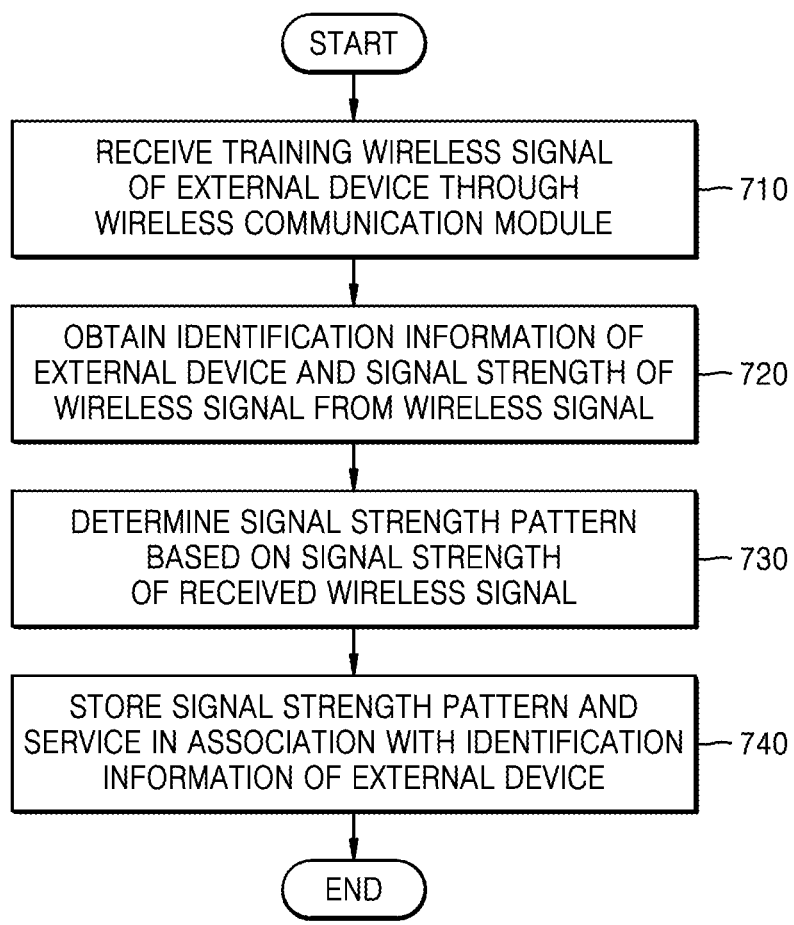
FIG. 7 is a flowchart illustrating an example operation, performed by an electronic apparatus, of storing customized wireless tag information through wireless tag training, according to various embodiments.

FIG. 7 is a flowchart illustrating an example operation, performed by the electronic apparatus 100, of storing customized wireless tag information through wireless tag training, according to various embodiments.

Referring to FIG. 7, in operation 710, the electronic apparatus 100 may receive a training wireless signal of an external device through a wireless communication module. The training wireless signal may be a Bluetooth signal based on Bluetooth communication, or a Wi-Fi signal based on Wi-Fi communication.

In operation 720, the electronic apparatus 100 may obtain identification information of the external device and a signal strength of the wireless signal from the received training wireless signal.

In operation 730, the electronic apparatus 100 may determine a signal strength pattern based on the signal strength of the received training wireless signal.

According to an embodiment, when the signal strength pattern shows that the strength of the wireless signal increases and then decreases, the electronic apparatus 100 may determine that a wireless tag event occurs.

Figure 8:
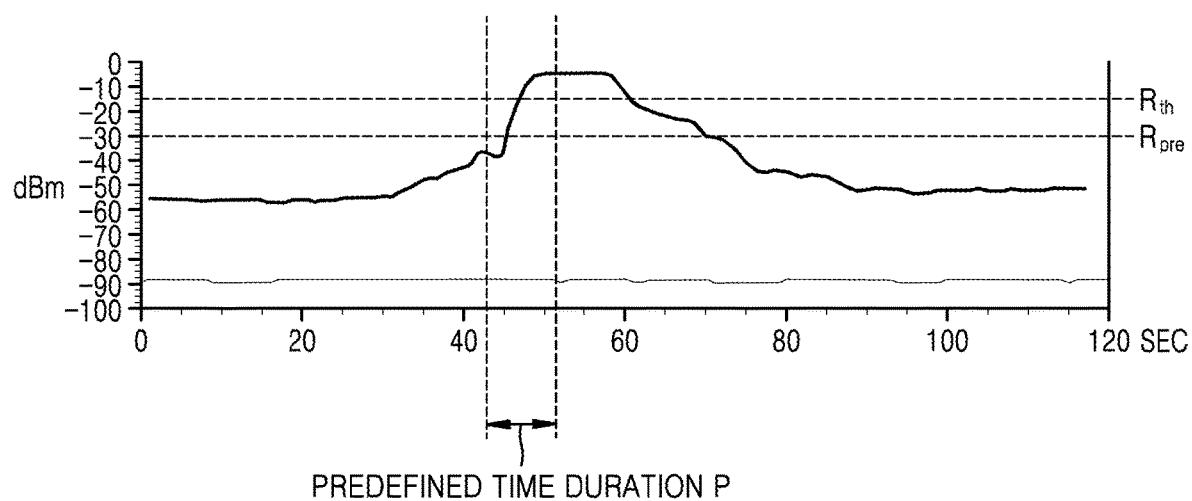
FIG. 8 is a graph illustrating an example method of determining a signal strength pattern serving as a criterion for generating a wireless tag event, according to various embodiments.

FIG. 8 is a graph illustrating an example method of determining a signal strength pattern serving as a criterion for generating a wireless tag event, according to various embodiments.

Referring to FIG. 8, when a Bluetooth or Wi-Fi external device approaches, a strength of a wireless signal of the external device increases and, when the external device moves away, the strength of the wireless signal decreases. Referring to FIG. 8, duration 1 represents a duration in which the external device approaches the electronic apparatus 100 and thus the strength of the wireless signal increases, duration 2 represents a duration in which the external device is located closest to the electronic apparatus 100 and thus the strength of the wireless signal the highest, and durations 3 and 4 represent durations in which the external device moves away from the electronic apparatus 100 and thus the strength of the wireless signal decreases. In general, a signal strength pattern similar to that shown in FIG. 8 is exhibited when a user performs a wireless tag operation of bringing the external device close to and then away from the electronic apparatus 100. Therefore, in an embodiment of the disclosure, the signal strength pattern exhibited due to the wireless tag operation may be used to determine a signal strength pattern serving as a criterion for detecting a wireless tag event.

Referring to FIG. 8, according to an embodiment, the electronic apparatus 100 may determine two parameters Rth and Rpre as parameters for defining a signal strength pattern. Rth is a first threshold parameter that the strength of the received wireless signal is required to exceed, and Rpre is a second threshold parameter that the strength of the wireless signal is required not to reach. For example, Rpre denotes a second threshold parameter that the wireless signal strength is required not to reach at a timing which is prior to a timing when the strength of the wireless signal exceeds the first threshold parameter Rth, by a predefined time duration P. That is, the electronic apparatus 100 may check a timing when the strength of the received wireless signal is greater than Rth, and determine that a wireless tag event occurs with respect to the wireless signal, when the strength of the wireless signal at a timing prior to the above-mentioned timing by the predefined time duration P is less than Rpre. In this case, the electronic apparatus 100 may determine the parameters serving as criteria for generating a wireless tag event, e.g., the first threshold parameter Rth and the second threshold parameter Rpre, on the basis of a received training wireless signal.

Figure 9:
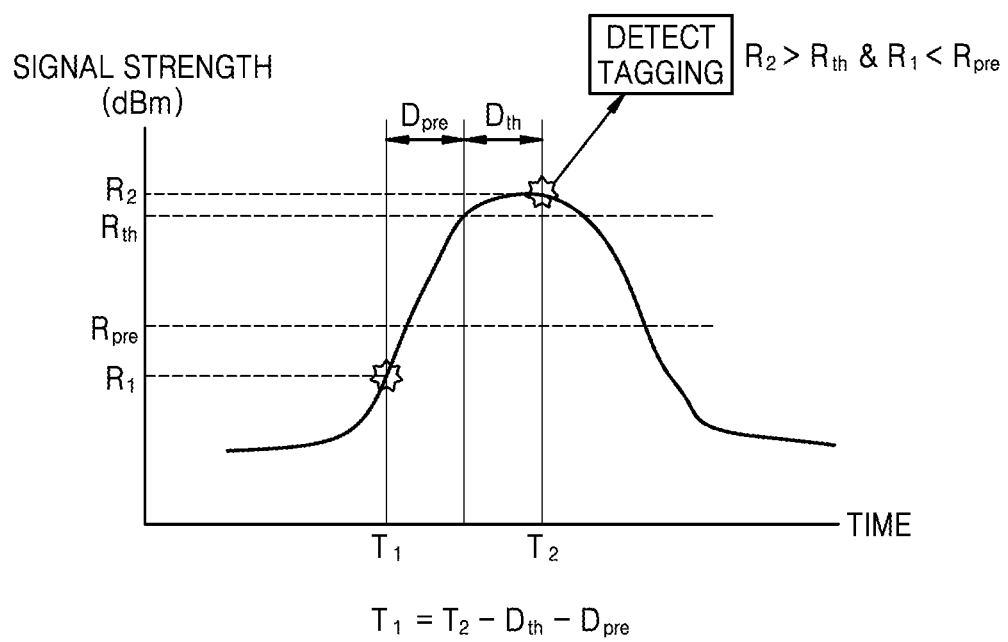
FIG. 9 is a graph illustrating an example method of determining a signal strength pattern serving as a criterion for generating a wireless tag event, according to various embodiments.

FIG. 9 is a graph illustrating an example method of determining a signal strength pattern serving as a criterion for generating a wireless tag event, according to various embodiments.

According to an embodiment, the electronic apparatus 100 may detect two or more durations to detect an increase in signal strength and a maintenance in signal strength to detect a wireless tag event. Because a wireless signal frequently exhibits an increase and a decrease in signal strength due to its characteristics, a stable wireless tag event may be detected by setting increasing and maintenance (threshold) durations. Therefore, according to an embodiment, the electronic apparatus 100 may determine two signal strengths $R_{th}$ and $R_{pre}$ and two durations $D_{th}$ and $D_{pre}$ as parameters serving as criteria for generating a wireless tag event.

$R_{th}$ may include a threshold RSSI value for determining whether an external device is in proximity.

$D_{th}$ may include a duration in which the threshold value $R_{th}$ needs to be maintained when it is determined that the external device is in proximity.

$R_{pre}$ may include a threshold value for checking a previous RSSI when the threshold $R_{th}$/duration is detected.

$D_{pre}$ may include a duration to be checked to determine whether a value less than the previous RSSI exists.

Using the above parameters, when it is determined that a strength of a received wireless signal is maintained to be greater than or equal to the upper threshold value $R_{th}$ for the duration $D_{th}$ or longer, and has a value less than the lower threshold value $R_{pre}$ in the duration $D_{pre}$ prior to the duration $D_{th}$, the electronic apparatus 100 may detect a wireless tag event. ($R_2 > R_{th}$ & $R_1 < R_{pre}$)

For example, the electronic apparatus 100 may initially determine whether the strength of the received wireless signal exceeding the upper threshold parameter value $R_{th}$ is maintained for the duration $D_{th}$, determine whether a wireless signal strength value less than the lower threshold parameter value $R_{pre}$ exists in the duration $D_{pre}$ prior to the duration $D_{th}$, when it is determined that the strength exceeding the upper threshold parameter value $R_{th}$ is maintained for the duration $D_{th}$, and determine that a wireless tag event occurs, when the wireless signal strength value less than the lower threshold parameter value Rpre exists. That is, the electronic apparatus 100 may determine that a wireless tag event occurs, considering not only a high strength of a received wireless signal but also a low strength of the wireless signal at a timing prior to the timing when the strength of the wireless signal is high, thereby more reliably detecting generation of a wireless tag. Therefore, to detect generation of a wireless tag event, the electronic apparatus 100 may determine the above-described four parameter values, e.g., $R_{th}$, $D_{th}$, $R_{pre}$, and $R_{th}$, based on a training wireless signal received from the external device 200, and use the determined parameter values as a signal strength pattern serving as a criterion for generating a wireless tag event.

A signal strength serving as a criterion for detecting a wireless tag between devices varies depending on a device type such as a cover material of a device, a device installation location/method such as installation of TV wall mounts, or a mobile device holding method for a tagging operation. In addition, a wireless signal sensing duration may be determined differently depending on a signal scan cycle. The number of sample durations to be used for sensing according to the wireless signal sensing cycle may also vary depending on system circumstances. In an embodiment of the disclosure, to consider the signal deviation, sensing cycle, user tagging operation, etc. depending on the device circumstances, the electronic apparatus 100 may determine a signal strength pattern serving as a criterion for generating a wireless tag event, which is suitable for each external device, when a training wireless signal is received from the external device, thereby obtaining wireless tag information better customized for the external device.

Referring back to FIG. 7, in operation 740, the electronic apparatus 100 may store customized wireless tag information by determining the signal strength pattern and a service in association with the identification information of the external device. According to an embodiment, the electronic apparatus 100 may store customized wireless tag information shown, for example, in FIG. 10.

Figure 10:
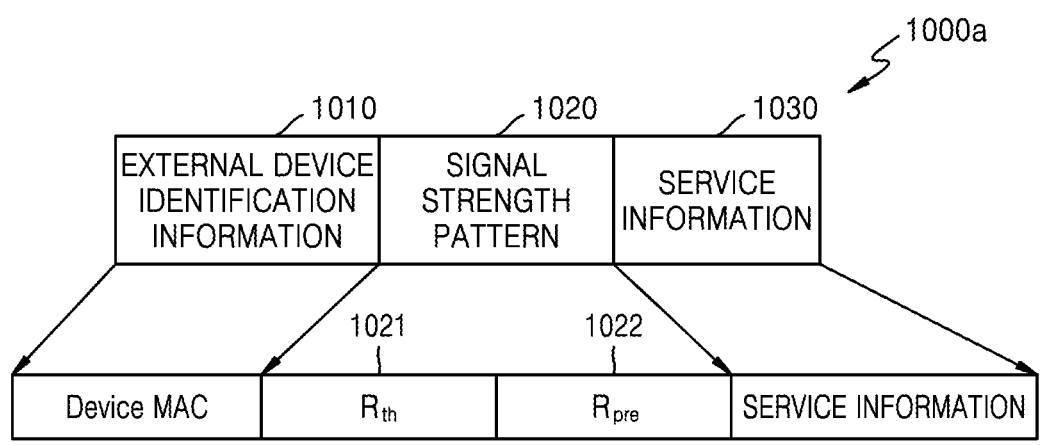
FIG. 10 is a diagram illustrating an example of customized wireless tag information according to various embodiments.

FIG. 10 is a diagram illustrating an example of customized wireless tag information according to various embodiments.

Referring to FIG. 10, customized wireless tag information 1000a may include external device identification information 1010, a signal strength pattern 1020, and service information 1030.

The external device identification information 1010 may include information for identifying an external device and may include, for example, a device MAC address. The external device identification information 1010 may include a Bluetooth MAC address for Bluetooth communication, or a Wi-Fi MAC address for Wi-Fi communication. The MAC address may be carried in a wireless signal received from the external device, and the electronic apparatus 100 may obtain the MAC address from the received wireless signal.

The signal strength pattern 1020 may include a signal strength pattern serving as a criterion used by the electronic apparatus 100 to determine whether a wireless tag operation as generation of a wireless tag event and may include, for example, the signal strength pattern determined in operation 730. Referring to FIG. 10, according to an example, the signal strength pattern 1020 may include two parameters $R_{th}$ (1021) and $R_{pre}$ (1022).

The service information 1030 represents service information indicating a service to be performed when the wireless signal detected by the electronic apparatus 100 is determined as generation of a wireless tag event. The service information may include various types of content reproduction operations. For example, the various types of content reproduction operations may include screen mirroring, sound mirroring, and execution of various content reproduction applications.

Figure 11:
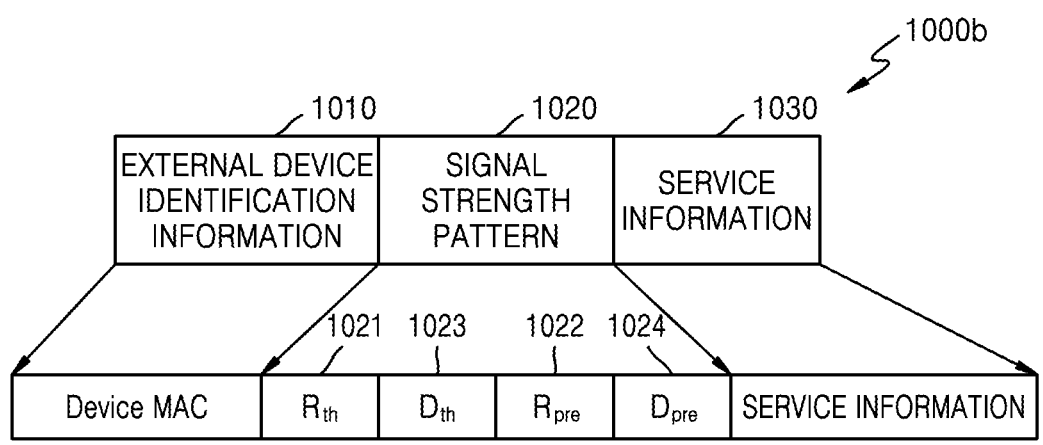
FIG. 11 is a diagram illustrating an example of customized wireless tag information according to various embodiments.

FIG. 11 is a diagram illustrating an example of customized wireless tag information according to various embodiments.

Referring to FIG. 11, the customized wireless tag information 1000b may include external device identification information 1010, a signal strength pattern 1020, and service information 1030.

The customized wireless tag information 1000b shown in FIG. 11 is substantially similar to the customized wireless tag information 1000a shown in FIG. 10, but differs in the signal strength pattern 1020.

Although the signal strength pattern 1020 shown in FIG. 10 includes two parameters $R_{th}$ (1021) and Rpre (1022), the signal strength pattern 1020 shown in FIG. 11 may further include $D_{th}$ (1023) and $D_{pre}$ (1024) in addition to the two parameters $R_{th}$ (1021) and $R_{pre}$ (1022).

Figure 12:
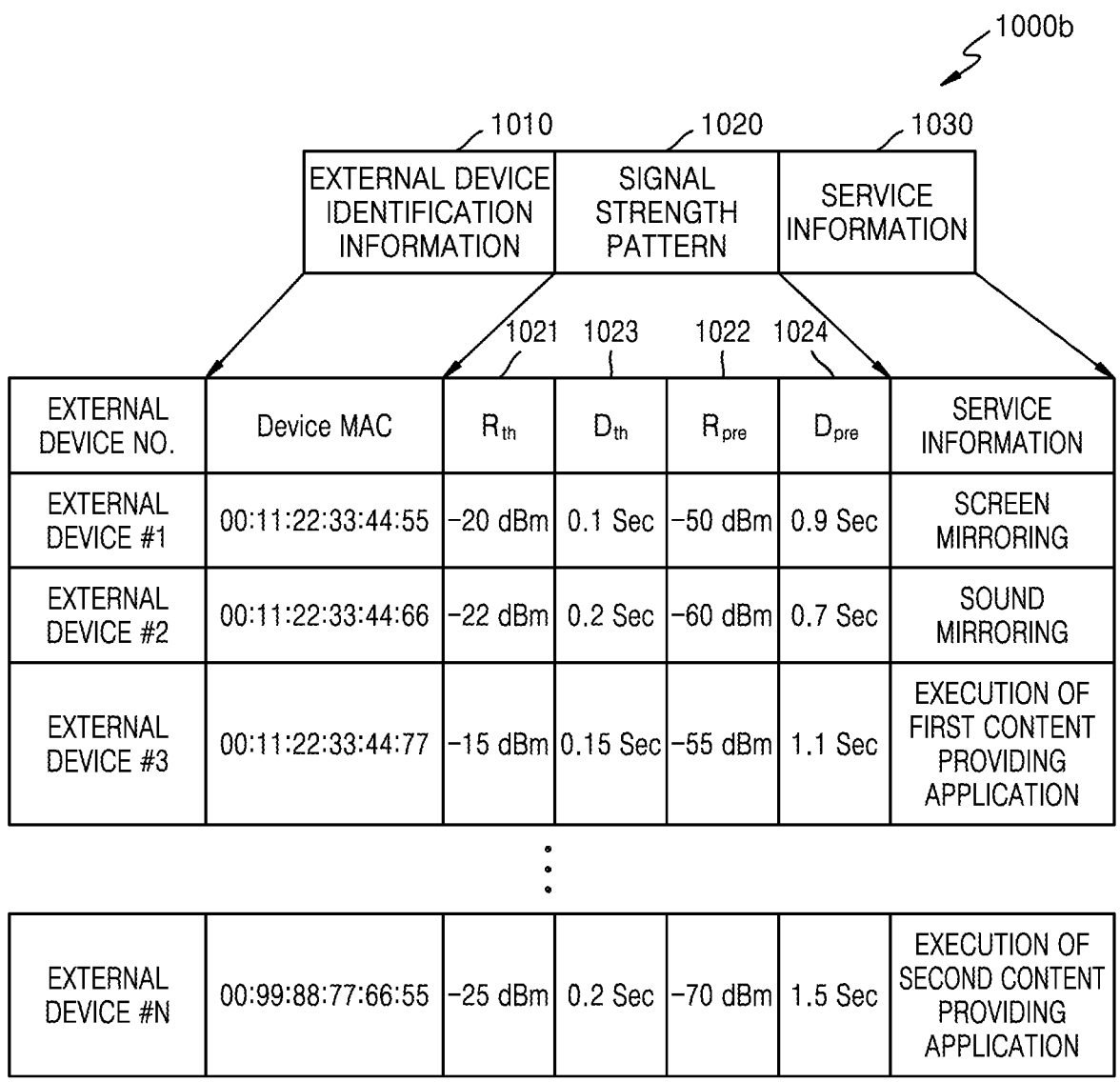
FIG. 12 is a diagram illustrating an example of the customized wireless tag information shown in FIG. 11, according to various embodiments.

FIG. 12 is a diagram illustrating an example of the customized wireless tag information shown in FIG. 11, according to various embodiments.

Referring to FIG. 12, the customized wireless tag information 1000b may include the external device identification information 1010, the signal strength pattern 1020, and the service information 1030.

The customized wireless tag information 1000b shown in FIG. 12 includes customized wireless tag information of N external devices from external device #1 to external device #N.

For example, the external device identification information 1010 corresponding to the external device #1 is <00: 11:22:33:44:55>, and the parameters $R_{th}$ (1021), $D_{th}$ (1023), $R_{pre}$ (1022), and $D_{pre}$ (1024) included in the signal strength pattern 1020 are −20 dBm, 0.1 sec., −50 dBm, and 0.9 sec., respectively. For example, when a wireless signal is received from the external device #1, and when the electronic apparatus 100 determines that a strength of the received wireless signal exceeding the value $R_{th}$, e.g., −20 dBm, is maintained for the duration $D_{th}$ (1023), e.g., 0.1 sec., considering the parameters of the signal strength pattern corresponding to the external device #1, the electronic apparatus 100 may determine whether a wireless signal strength less than −50 dBm exists in the duration $D_{pre}$ (1024), e.g., the duration of 0.9 sec. prior to the duration of 0.1 sec. When it is determined that such a wireless signal strength exists, the electronic apparatus 100 may determine that a wireless tag event occurs.

As described above, when it is determined that a wireless signal from the external device #1 corresponds to generation of a wireless tag event, the service information indicating a service to be performed by the electronic apparatus 100 indicates screen mirroring. That is, when it is determined that a wireless signal from the external device #1 corresponds to generation of a wireless tag event, the electronic apparatus 100 may receive, from the external device #1, information about content to be screen-mirrored, and perform screen mirroring, based on the received information about the content.

When it is determined that a wireless signal from the external device #2 corresponds to generation of a wireless tag event, the service information indicating a service to be performed by the electronic apparatus 100 indicates sound mirroring. That is, when it is determined that a wireless signal from the external device #2 corresponds to generation of a wireless tag event, the electronic apparatus 100 may receive, from the external device #2, information about content to be sound-mirrored, and perform sound mirroring, based on the received information about the content.

When it is determined that a wireless signal from the external device #3 corresponds to generation of a wireless tag event, the service information indicating a service to be performed by the electronic apparatus 100 indicates connection of a first content providing application. That is, when it is determined that a wireless signal from the external device #3 corresponds to generation of a wireless tag event, the electronic apparatus 100 may execute the first content providing application.

Figure 13:
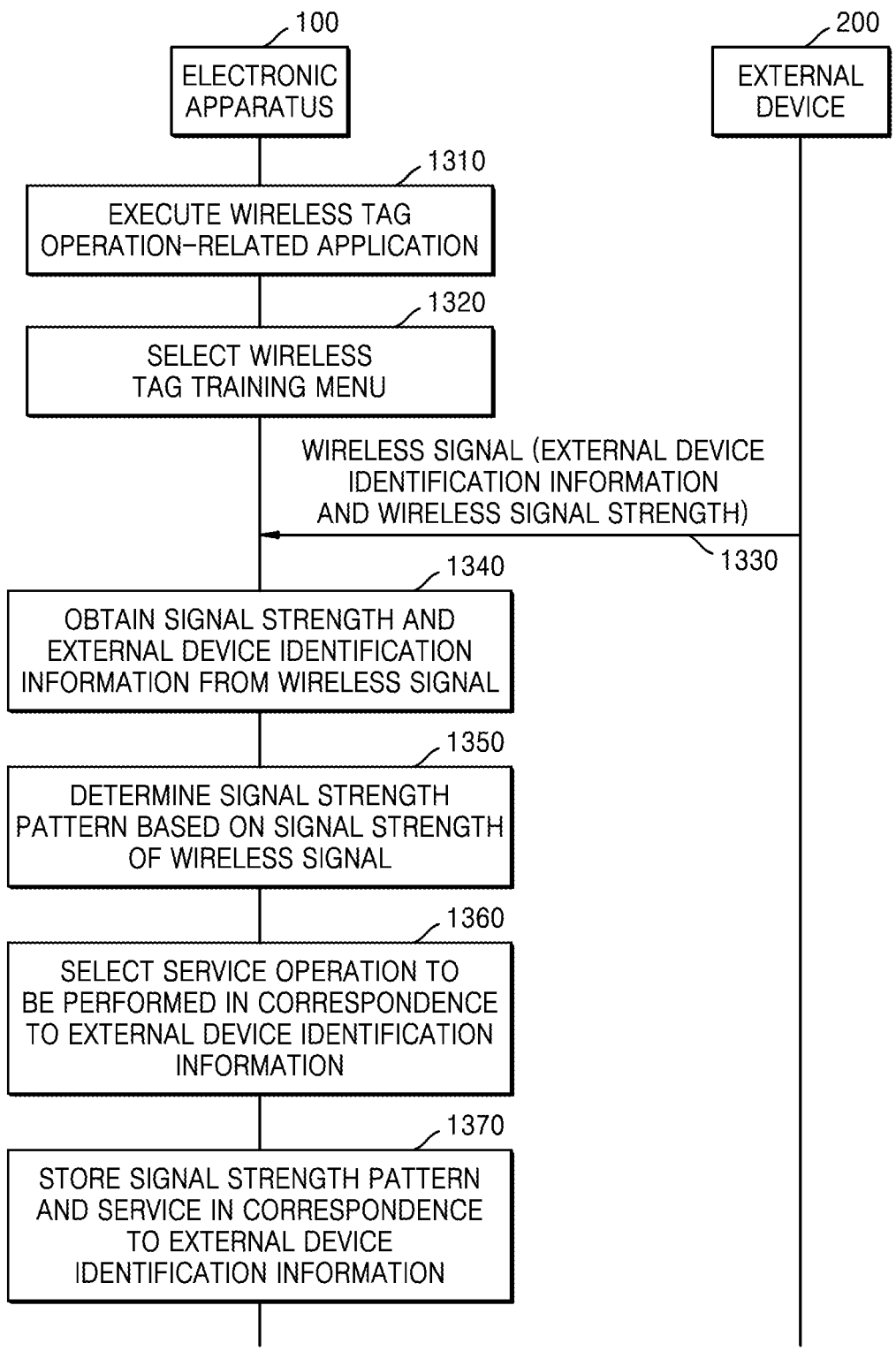
FIG. 13 is a signal flow diagram illustrating an example operation, performed by an electronic apparatus, of performing wireless tag setup, according to various embodiments.

FIG. 13 is a signal flow diagram illustrating an example operation, performed by the electronic apparatus 100, of performing wireless tag setup, according to various embodiments.

Referring to FIG. 13, in operation 1310, the electronic apparatus 100 may execute a wireless tag operation-related application capable of enabling setup or adjustment related to a wireless tag operation including wireless tag training. The wireless tag operation-related application may include, for example, the Digital Butler application provided by the applicant. For example, the electronic apparatus 100 may receive a user input for selecting the wireless tag operation-related application from among applications installed in the electronic apparatus 100, and execute the selected wireless tag operation-related application.

In operation 1320, the electronic apparatus 100 may select a wireless tag training menu. For example, the electronic apparatus 100 may receive a user input for selecting the wireless tag training menu, and execute the wireless tag training menu selected based on the user input.

In operation 1330, the electronic apparatus 100 may receive a training wireless signal for wireless tag training from the external device 200.

For example, when a user holding the external device 200 performs a specific operation, e.g., an operation of bringing the external device 200 close to and then away from the electronic apparatus 100, the electronic apparatus 100 may receive a wireless signal from the external device 200, and the wireless signal received by the electronic apparatus 100 may include identification information of the external device 200 and a wireless signal strength that varies depending on a specific operation of the external device 200.

In operation 1340, the electronic apparatus 100 may obtain the wireless signal strength and the external device identification information from the wireless signal received from the external device 200.

In operation 1350, the electronic apparatus 100 may determine a signal strength pattern serving as a criterion for generating a wireless tag event, based on the obtained signal strength of the wireless signal.

In operation 1360, the electronic apparatus 100 may select a service operation to be performed in correspondence to generation of a wireless tag event with respect to the external device identification information. According to an embodiment, the service operation to be performed in correspondence to generation of a wireless tag event may be received using a user input from the user. According to an embodiment, the service operation to be performed in correspondence to generation of a wireless tag event may be selected as a default value by the electronic apparatus 100.

In operation 1370, the electronic apparatus 100 may store the signal strength pattern created in correspondence to the external device identification information, and the selected service operation, as customized wireless tag information.

A user interface for wireless tag setup will now be described in greater detail below with reference to FIGS. 14 to 19.

Figure 14:
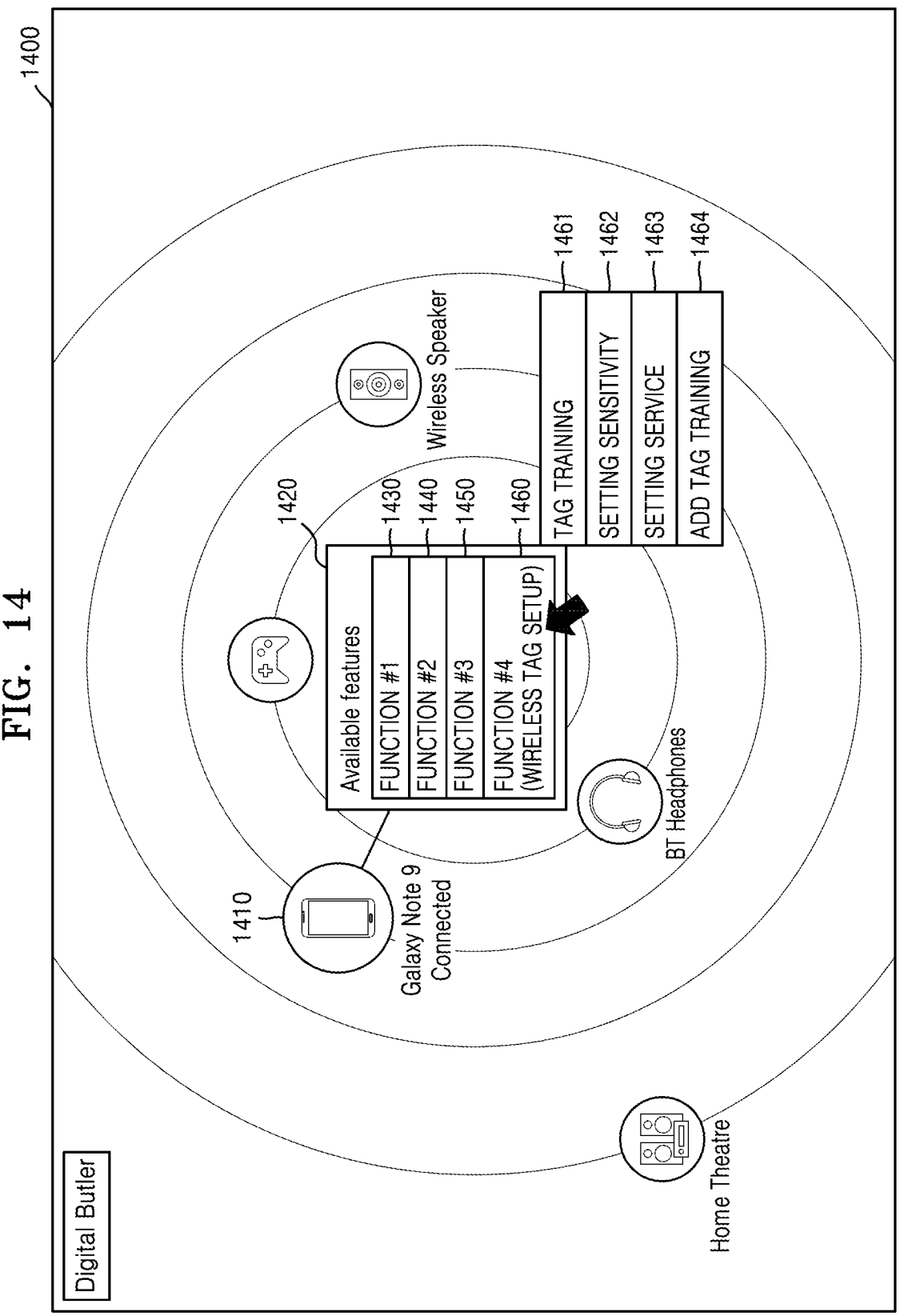
FIG. 14 is a diagram illustrating an example of a user interface provided by an electronic apparatus for wireless tag setup, according to various embodiments.

FIG. 14 is a diagram illustrating an example of a user interface provided by the electronic apparatus 100 for wireless tag setup, according to various embodiments.

Referring to FIG. 14, according to an embodiment, the electronic apparatus 100 may discover wireless devices or home appliances in the vicinity of the electronic apparatus 100, and provide a peripheral device management application capable of showing and managing available features related to the discovered wireless devices or home appliances. The user interface shown in FIG. 14 shows an example of a graphical user interface providable by the peripheral device management application.

Referring to FIG. 14, a graphical user interface 1400 provided by the peripheral device management application may display one or more peripheral devices discovered by the electronic apparatus 100, e.g., a smartphone, a home theatre, BT headphones, and a wireless speaker.

Features available for each peripheral device may be displayed with respect to the device. For example, as available features 1420 corresponding to a smartphone 1410, one or more functions such as function #1 1430, function #2 1440, function #3 1450, and function #4 1460 may be displayed. A wireless tag setup function may be added as one of the functions.

When a wireless tag setup 1460 corresponding to the function #4 is selected, a tag training item 1461, a setting sensitivity item 1462, a setting service item 1463, and an add tag training item 1464 may be displayed as submenus.

The tag training item 1461 may include a menu for creating customized wireless tag information per device by receiving a wireless signal based on a wireless tag operation and determining a signal strength pattern for initial wireless tag setup.

The setting sensitivity item 1462 may include a menu for adjusting one or more parameter values included in a wireless signal strength pattern by setting or adjusting sensitivity of a strength of a wireless signal to create customized wireless tag information in correspondence to an external device.

The setting service item 1463 may include a menu for setting a service operation to be performed when it is determined that a wireless tag event occurs in correspondence to an external device.

The add tag training item 1464 may include a menu for creating a plurality of pieces of customized wireless tag information with respect to the same external device. For example, the add tag training item 1464 is a menu for separately creating customized wireless tag information corresponding to a wireless tag operation performed using the external device by a user near the electronic apparatus 100, and customized wireless tag information corresponding to a wireless tag operation performed using the same external device by the user at a location far from the electronic apparatus 100, e.g., the user sitting on a sofa.

Figure 15:
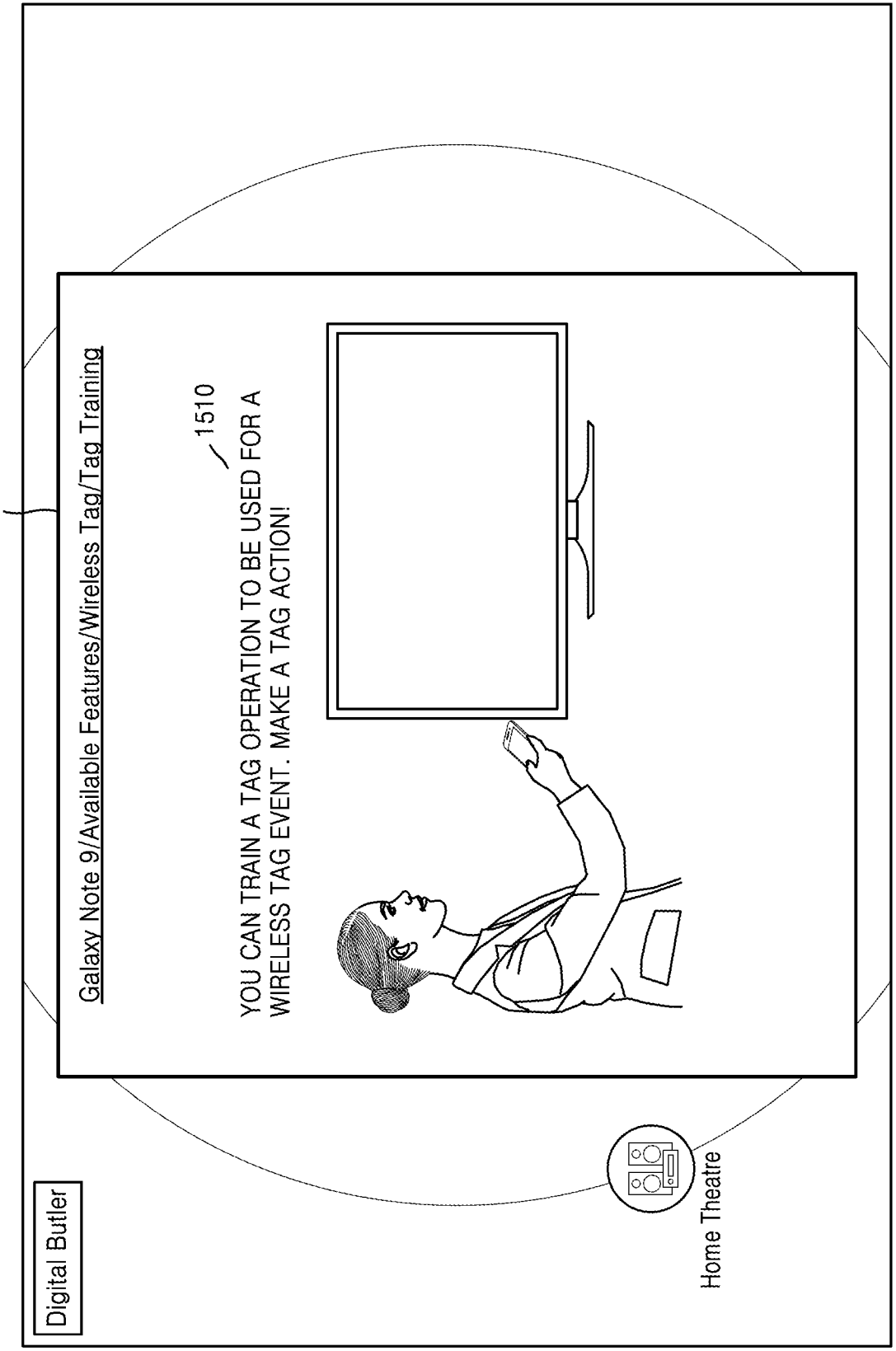
FIG. 15 is a diagram illustrating an example of a graphical user interface provided in response to selection of a tag training item, according to various embodiments.

FIG. 15 is a diagram illustrating an example of a graphical user interface provided in response to selection of the tag training item 1461, according to various embodiments.

Referring to FIG. 15, when a user selects the tag training item 1461 on the graphical user interface shown in FIG. 14 to register a new external device in the electronic apparatus 100 as a device for a wireless tag operation, for example, the electronic apparatus 100 may output a graphical user interface 1500 including a message for inducing a tag action to be made.

The graphical user interface 1500 shown in FIG. 15 may provide a message 1510 saying <You can train a tag operation to be used for a wireless tag event. Make a tag action!>. An example of a tag action may be viewed under the message 1510 as a guide for the tag action to be made by the user.

When the user holds the external device 200 and makes a tag action in correspondence to the graphical user interface 1500, for example, the user holds the external device 200 and performs a tag operation of bringing the external device 200 close to and then away from the electronic apparatus 100, the electronic apparatus 100 may receive a wireless signal from the external device 200. The electronic apparatus 100 may obtain identification information of the external device 200 and a strength of the wireless signal from the wireless signal, determine a signal strength pattern serving as a criterion for determining generation of a wireless tag event in correspondence to the external device 200, using the identification information of the external device 200 and the strength of the wireless signal, and create customized wireless tag information corresponding to the external device 200.

Figure 16:
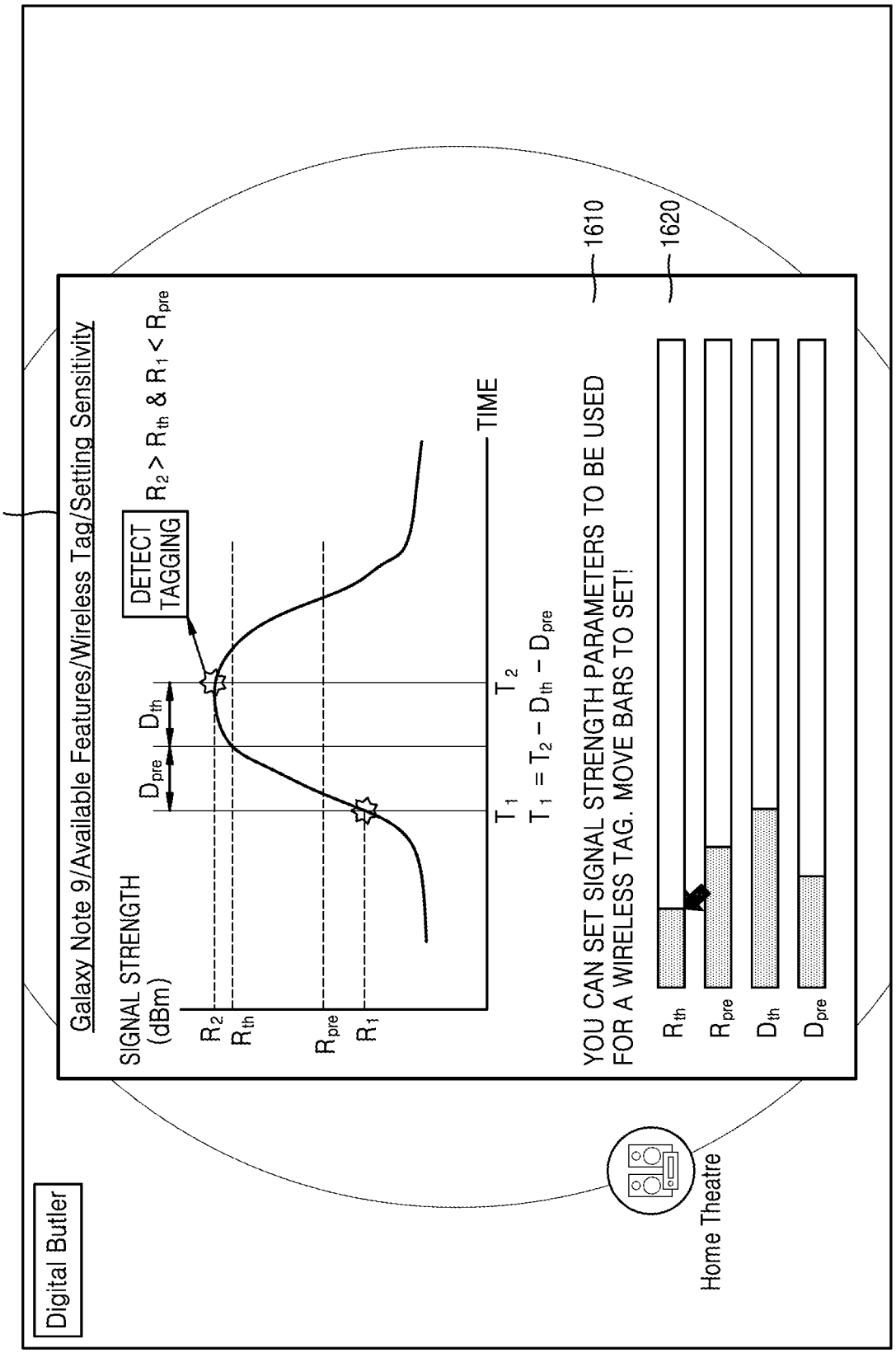
FIG. 16 is a diagram illustrating an example of a graphical user interface provided in response to selection of a setting sensitivity item, according to various embodiments.

FIG. 16 is a diagram illustrating an example of a graphical user interface provided in response to selection of the setting sensitivity item 1462, according to various embodiments.

Referring to FIG. 16, when a user selects the setting sensitivity item 1462 on the graphical user interface shown in FIG. 14 to adjust sensitivity of a strength of a wireless signal used to determine whether a wireless tag event occurs based on a wireless tag operation of an external device, for example, the electronic apparatus 100 may output a graphical user interface 1600 used to set parameter values of a wireless signal strength pattern.

Referring to FIG. 16, the graphical user interface 1600 may include a message 1610 saying <You can set signal strength parameters to be used for a wireless tag. Move bars to set!>, together with one or more adjustable bars 1620 used to adjust one or more parameters included in the signal strength pattern.

The adjustable bar 1620 corresponding to each parameter may be adjusted from 1 to 10 based on a user input. By adjusting the adjustable bar 1620 corresponding to each parameter, the user may determine whether to sensitively or insensitively detect a wireless signal for each external device. For example, when the user desires to generate a wireless tag event only when a very accurate tagging operation is performed as a wireless tag operation, the user may set the sensitivity of the wireless signal to be high and, when the user desires to generate a wireless tag event even when a negligent and rough tagging operation is performed as a wireless tag operation, the user may set the sensitivity of the wireless signal to be low. To set a high sensitivity of the wireless signal, the user may increase a difference between a signal strength upper threshold value and a signal strength lower threshold value by setting a signal strength upper threshold parameter Rth to a high value and setting a signal strength lower threshold parameter Rpre to a low value, and thus control a tag event to be generated when an accurate tagging operation is performed. To set a low sensitivity of the wireless signal, the user may reduce the difference between the signal strength upper threshold value and the signal strength lower threshold value by setting the signal strength upper threshold parameter Rth to a relatively low value and setting the signal strength lower threshold parameter Rpre to a relatively high value, and thus control a tag event to be generated even when an inaccurate tagging operation is performed.

Although a menu used to separately set the parameter values for the signal strength pattern is provided to the user in the example of FIG. 16, the menu used to set the sensitivity of the strength of the wireless signal may be determined in various manners. For example, when the electronic apparatus 100 requests the user to separately set the parameter values used for the signal strength pattern, it may place a burden on the user in setting the sensitivity. Therefore, the electronic apparatus 100 may provide only one bar instead of the menu for separately setting the parameter values, to allow the user to merely select a high or low sensitivity of the strength of the wireless signal, and autonomously determine the parameter values used for the signal strength pattern based on the selection of the user.

Figure 17:
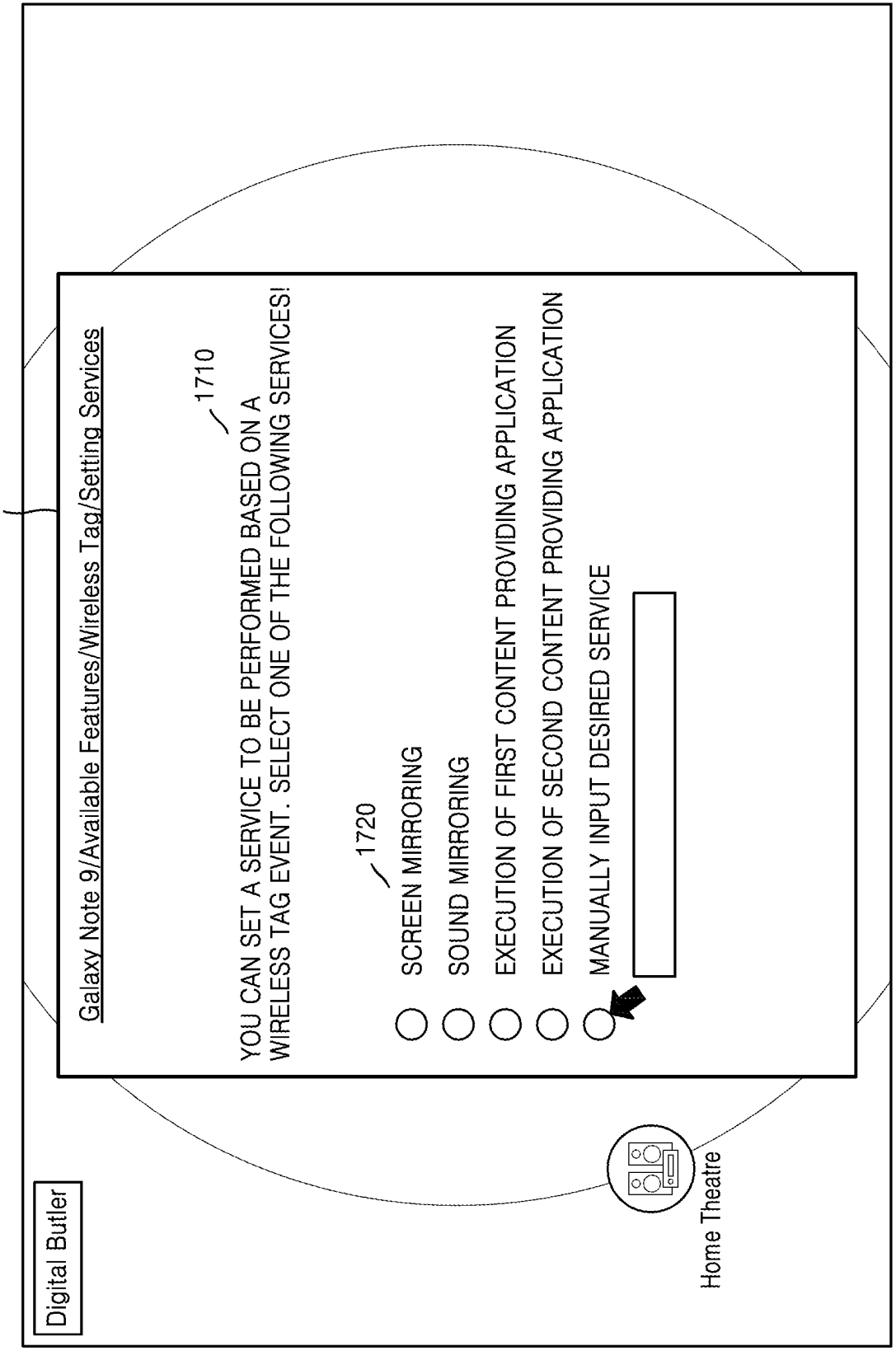
FIG. 17 is a diagram illustrating an example of a graphical user interface provided in response to selection of a setting service item, according to various embodiments.

FIG. 17 is a diagram illustrating an example of a graphical user interface provided in response to selection of the setting service item 1463, according to various embodiments.

Referring to FIG. 17, when a user selects the setting service item 1463 on the graphical user interface shown in FIG. 14 to set a service operation to be provided when a wireless tag event occurs based on a wireless tag operation of an external device, for example, the electronic apparatus 100 may output a graphical user interface 1700 used to set services.

Referring to FIG. 17, the graphical user interface 1700 may output a message 1710 saying <You can set a service to be performed based on a wireless tag event. Select one of the following services!>, together with a menu 1720 used to select one of various service items.

According to an embodiment, the menu 1720 may include an item used to select screen mirroring which allows audio visual content reproduced on the external device, to be equally reproduced on the electronic apparatus 100, an item used to select sound mirroring which allows audio content reproduced on the external device, to be equally reproduced on the electronic apparatus 100, an item used to select execution of a first content providing application, an item used to select execution of a second content providing application, or an item used to manually input a desired service. The service items displayed on the menu 1720 shown in FIG. 17 are examples, and more or less items may be displayed.

As described above, by setting a service to be performed for each external device when a wireless tag event occurs, the user may set a different desired service for the external device. For example, when the external device is a smartphone, the user may set a sound mirroring service to be performed when a wireless tag event occurs in correspondence to the smartphone and, when the external device is a tablet PC, the user may set a screen mirroring service to be performed when a wireless tag event occurs in correspondence to the tablet PC.

Figure 18:
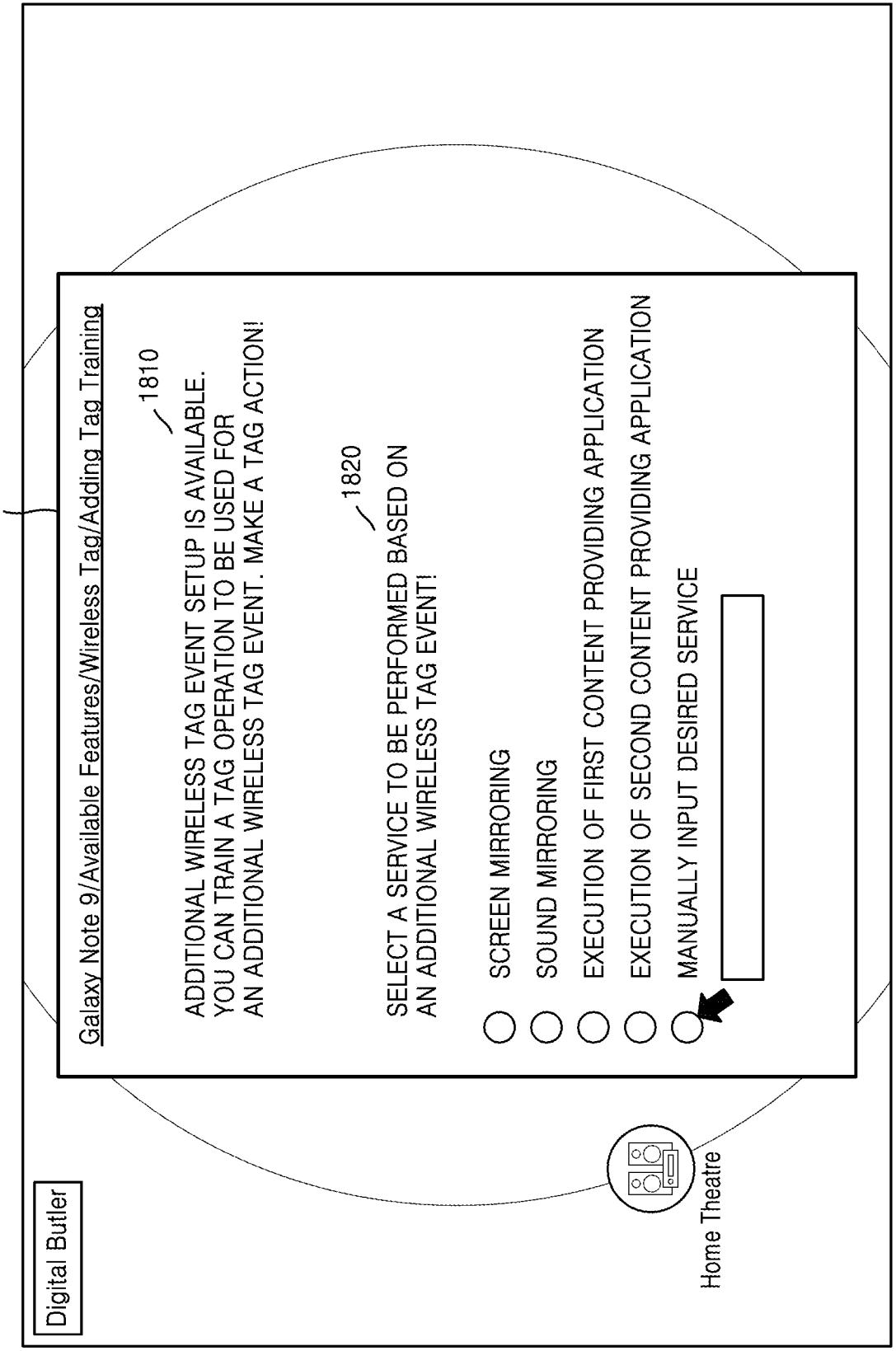
FIG. 18 is a diagram illustrating an example of a graphical user interface provided in response to selection of an add tag training item, according to various embodiments.

FIG. 18 is a diagram illustrating an example of a graphical user interface provided in response to selection of the add tag training item 1464, according to various embodiments.

Referring to FIG. 18, when a user selects the add tag training item 1464 on the graphical user interface shown in FIG. 14 to add wireless tag training to a pre-registered external device, for example, the electronic apparatus 100 may output a graphical user interface 1800 used to add tag training.

The add tag training item 1464 may be used when, for example, the user desires different services to be provided based on different wireless tag operations with respect to one external device. For example, using the same smartphone, a first service may be provided based on generation of a wireless tag event near the electronic apparatus 100, and a second service may be provided based on generation of a wireless tag event at a location far from the electronic apparatus 100, e.g., at a sofa. Because a strength of a wireless signal received from a location close to the electronic apparatus 100 differs from a strength of a wireless signal received from a location far from the electronic apparatus 100, a signal strength pattern serving as a criterion for generating a wireless tag event needs to be determined differently. Therefore, the electronic apparatus 100 may provide the graphical user interface 1800 used to add tag training.

Referring to FIG. 18, the graphical user interface 1800 may output a message 1810 saying <Additional wireless tag event setup is available. You can train a tag operation to be used for an additional wireless tag event. Make a tag action!>, together with a menu 1820 used to select one of various service items.

When a training wireless signal based on a wireless tag operation of the external device is received in correspondence to the message 1810, the electronic apparatus 100 may determine a signal strength pattern based on the received training wireless signal.

The electronic apparatus 100 may store a service corresponding to identification information of the external device, as additional customized wireless tag information, based on a user input for selecting one item on the menu 1820.

Figure 19:
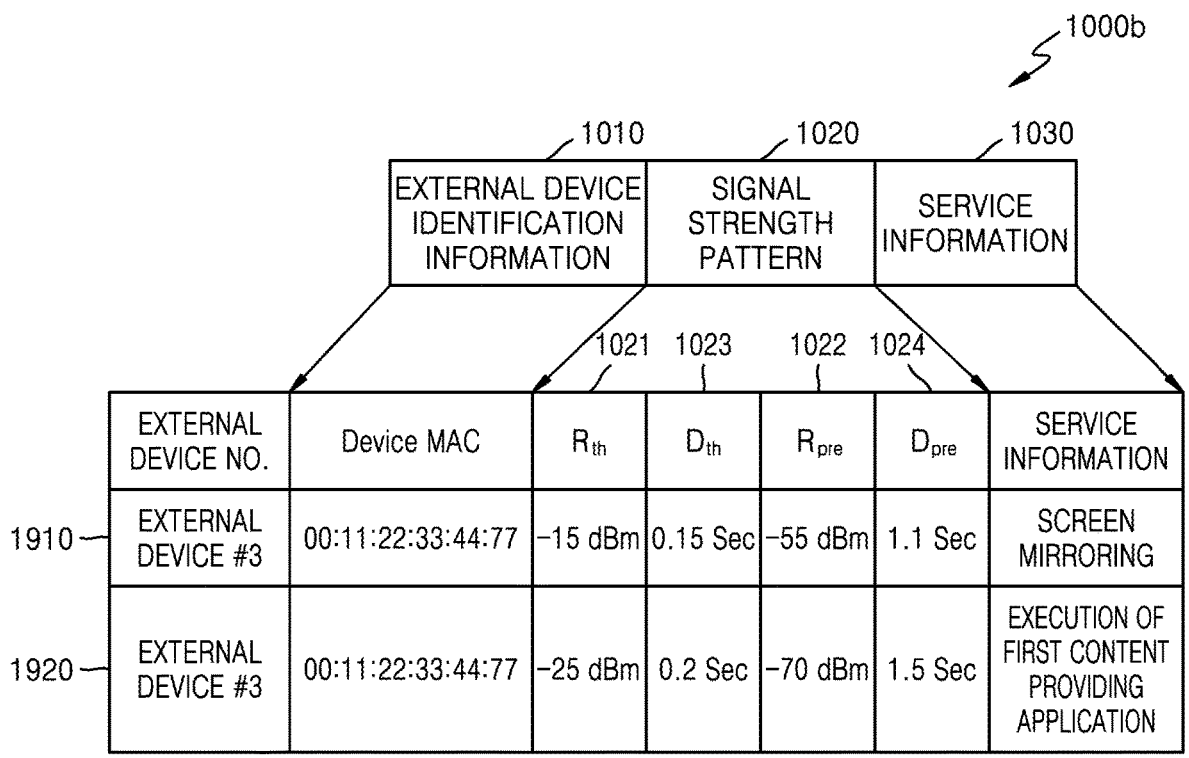
FIG. 19 is a diagram illustrating an example in which a plurality of pieces of customized wireless tag information are created with respect to one external device by adding tag training, according to various embodiments.

FIG. 19 is a diagram illustrating an example in which a plurality of pieces of customized wireless tag information are created with respect to one external device by adding tag training, according to various embodiments.

Referring to FIG. 19, two pieces of customized wireless tag information 1910 and 1920 may be created with respect to the same the external device #3. A value Rth of the customized wireless tag information 1910 corresponding to the external device #3 is set to be −15 dBm which is greater than the value Rth of the customized wireless tag information 1920, e.g., −25 dBm. The electronic apparatus 100 may create the customized wireless tag information 1910 which has a higher parameter value included in a wireless signal strength pattern, by receiving a wireless signal of the external device based on a wireless tag operation performed at a location closer to the electronic apparatus 100, and create the customized wireless tag information 1920 which has a lower parameter value included in a wireless signal strength pattern, by receiving a wireless signal of the external device based on a wireless tag operation performed at a location farther away from the electronic apparatus 100. Different pieces of service information are mapped to the two pieces of customized wireless tag information 1910 and 1920.

As described above, when a plurality of pieces of customized wireless tag information are created for one external device, and when a wireless signal based on a wireless tag operation of the external device is received, the electronic apparatus 100 may determine whether a wireless signal strength of the received wireless signal corresponds to the signal strength pattern of the customized wireless tag information 1910 or the signal strength pattern of the customized wireless tag information 1920, and perform a service operation mapped to the customized wireless tag information corresponding to the determined signal strength pattern. For example, when the electronic apparatus 100 receives a wireless signal of the external device #3 and when the received wireless signal corresponds to the signal strength pattern of the customized wireless tag information 1910, the electronic apparatus 100 may perform screen mirroring based on generation of a wireless tag event. For example, when the electronic apparatus 100 receives a wireless signal of the external device #3 and when the received wireless signal corresponds to the signal strength pattern of the customized wireless tag information 1920, the electronic apparatus 100 may execute a first content providing application based on generation of a wireless tag event.

As described above, by adding tag training, a user may set different services to be provided with respect to one external device, based on locations where wireless tag operations are performed using the external device.

According to an embodiment, the electronic apparatus 100 may use not only a strength of a wireless signal from an external device but also a sensor value measured by the external device, to determine whether a wireless tag event occurs. An example in which not only a strength of a wireless signal from an external device but also a sensor value measured by the external device are used to determine whether a wireless tag event occurs will now be described with reference to FIGS. 20 to 22.

Figure 20:
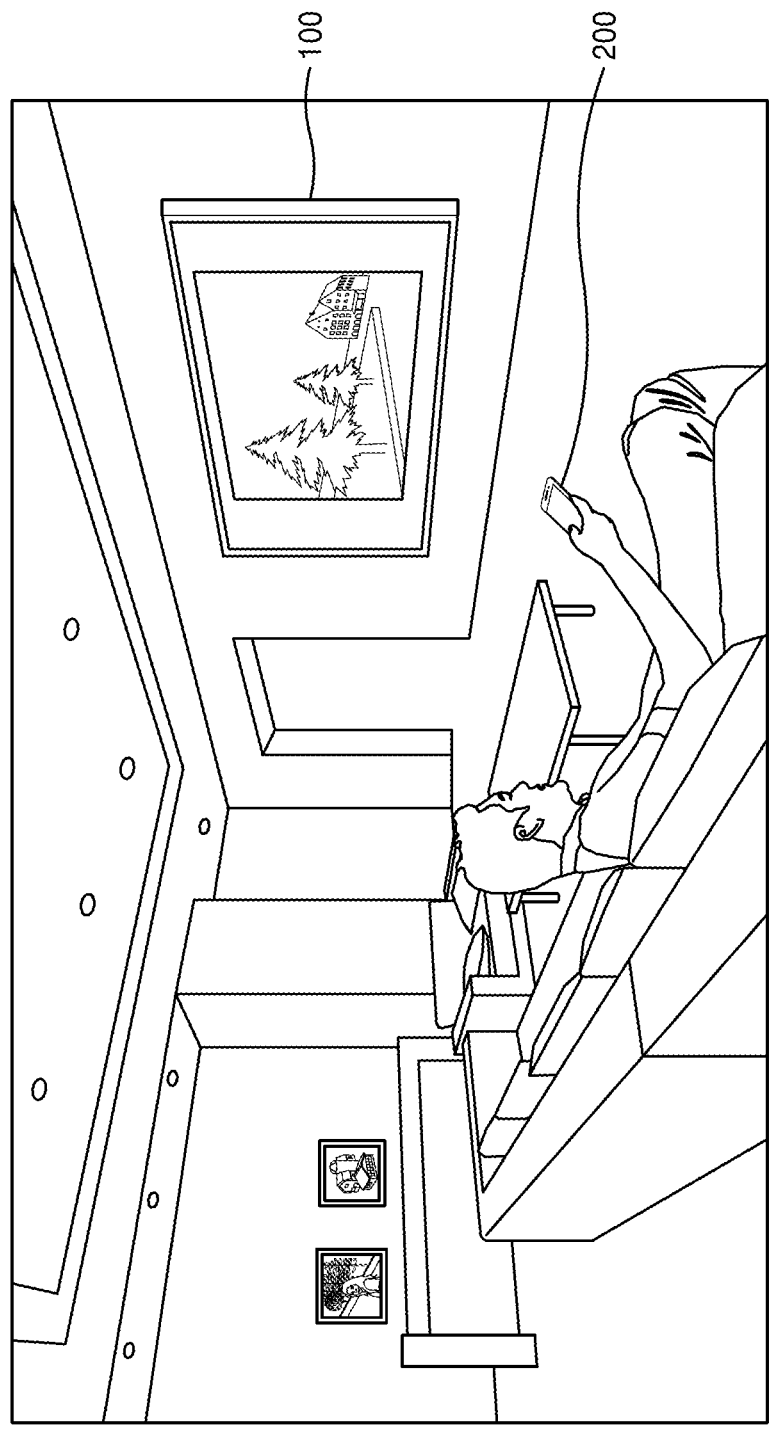
FIG. 20 is a diagram illustrating an example of a scenario in which a user generates a wireless tag event at a location relatively far from an electronic apparatus, according to various embodiments.

FIG. 20 is a diagram illustrating an example of a scenario in which a user generates a wireless tag event at a location relatively far from the electronic apparatus 100, according to various embodiments.

As shown in the reference view of FIG. 1, when a distance from the electronic apparatus 100 to the external device 200 which performs a wireless tag operation increases, a strength of a wireless signal received by the electronic apparatus 100 inevitably decreases. For example, as shown in FIG. 20, a user sitting on a sofa and reproducing content on a smartphone may desire to use screen mirroring to reproduce the content being reproduced on the smartphone, on the electronic apparatus 100 having a larger screen. At this time, having the user get up from the sofa and approach the electronic apparatus 100 to perform a wireless tag operation for screen mirroring may be very cumbersome to the user. Therefore, in this case, when the user may directly perform a wireless tag operation at the location where the user is, e.g., sitting on the sofa, to generate a wireless tag event for screen mirroring, more convenience may be provided to the user. However, when the user desires to generate wireless tag event at a location relatively far from the electronic apparatus 100, a wireless tag operation of the external device may not be reliably detected due to a low strength of a wireless signal of the external device and thus the electronic apparatus 100 may not easily determine whether to generate a wireless tag event. To compensate for this issue, in addition to the strength of the wireless signal from the external device, a sensor value measured by the external device 200 may be further used to determine whether a wireless tag event occurs.

Figure 21:
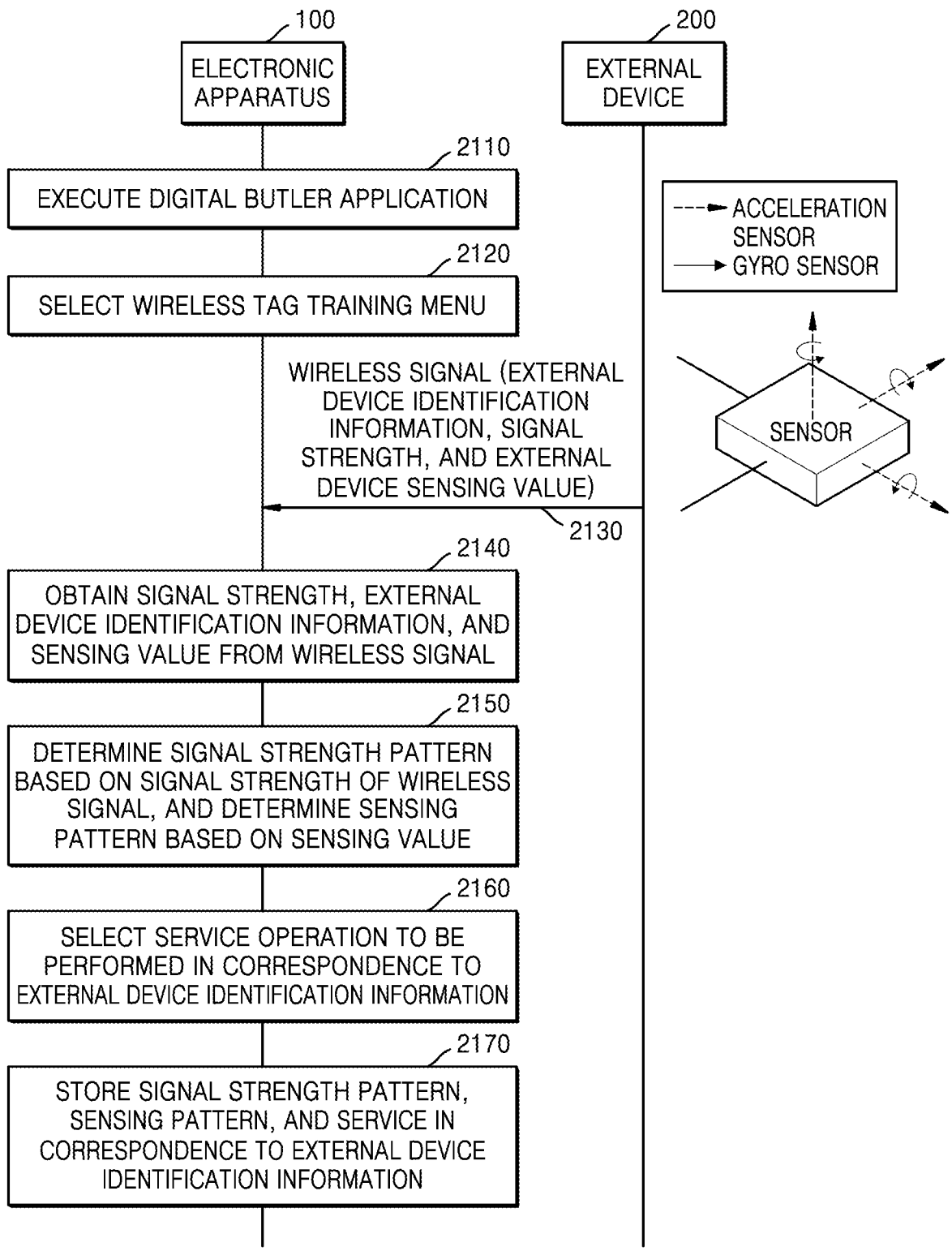
FIG. 21 is a signal flow diagram illustrating an example operation, performed by an electronic apparatus, of performing wireless tag setup by further using a sensing value of an external device, according to various embodiments.

FIG. 21 is a signal flow diagram illustrating an example operation, performed by the electronic apparatus 100, of performing wireless tag setup by further using a sensing value of an external device, according to various embodiments.

Referring to FIG. 21, in operation 2110, the electronic apparatus 100 may execute a wireless tag operation-related application capable of enabling setup or adjustment related to a wireless tag operation including wireless tag training. The wireless tag operation-related application may include, for example, the Digital Butler application. For example, the electronic apparatus 100 may receive a user input for selecting the wireless tag operation-related application from among applications installed in the electronic apparatus 100, and execute the selected wireless tag operation-related application.

In operation 2120, the electronic apparatus 100 may select a wireless tag training menu. For example, the electronic apparatus 100 may receive a user input for selecting the wireless tag training menu, and execute the wireless tag training menu selected based on the user input.

In operation 2130, the electronic apparatus 100 may receive a training wireless signal for wireless tag training from the external device 200.

For example, when a user holding the external device 200 performs a specific operation, e.g., an operation of bringing the external device 200 close to and then away from the electronic apparatus 100, the electronic apparatus 100 may receive a wireless signal from the external device 200, and the wireless signal received by the electronic apparatus 100 may include identification information of the external device 200 and a wireless signal strength that varies depending on a specific operation of the external device 200, and further include a sensor measurement value that varies depending on a specific operation of the external device 200.

When the user holds the external device 200 and performs a wireless tag operation, e.g., an operation of moving the external device 200 toward and away from the electronic apparatus 100 while holding the external device 200, one or more sensors included in the external device 200 may measure a location value based on the motion of the external device 200. For example, the location value measured by the external device 200 varies depending on a trajectory of the external device 200. Therefore, a pattern of the sensing value of the external device 200 may be used to determine the wireless tag operation of the external device 200.

The external device 200 may include various sensors for measuring the motion of the external device 200. For example, the external device 200 may sense the motion of the external device 200 using a gyroscope accelerometer and a gyro sensor. The accelerometer measures an acceleration, and the gyro sensor measures a rotational force. Both the accelerometer and the gyro sensor use 3-axis sensors, and the 3-axis sensor refers to a sensor capable of measuring an acceleration in x-axis, y-axis, and z-axis directions of a 3-dimensional (3D) space, and may measure a location and motion relative to the gravity. When the external device 200 transmits a wireless signal based on a wireless tag operation to the electronic apparatus 100, the sensing value measured by the sensors of the external device 200 may be included in the wireless signal.

In operation 2140, the electronic apparatus 100 may obtain the wireless signal strength, the sensing value, and the external device identification information from the wireless signal received from the external device 200.

In operation 2150, the electronic apparatus 100 may determine a signal strength pattern serving as a criterion for generating a wireless tag event, based on the obtained signal strength of the wireless signal, and determine a sensing pattern serving as a criterion for generating a wireless tag event, based on the obtained sensing value. For example, when the gyro sensor value and the acceleration sensor value are received as the sensing value, the electronic apparatus 100 may determine a threshold sensor value to be determined as generation of a wireless tag event, based on the received gyro sensor value and acceleration sensor value, and determine the threshold sensor value as the sensing pattern.

In operation 2160, the electronic apparatus 100 may select a service operation to be performed in correspondence to generation of a wireless tag event with respect to the external device identification information. According to an embodiment, the service operation to be performed in correspondence to generation of a wireless tag event may be received using a user input from the user. According to an embodiment, the service operation to be performed in correspondence to generation of a wireless tag event may be selected as a default value by the electronic apparatus 100.

In operation 2170, the electronic apparatus 100 may store the signal strength pattern and sensing pattern created in correspondence to the external device identification information, and the selected service operation, as customized wireless tag information.

Figure 22:
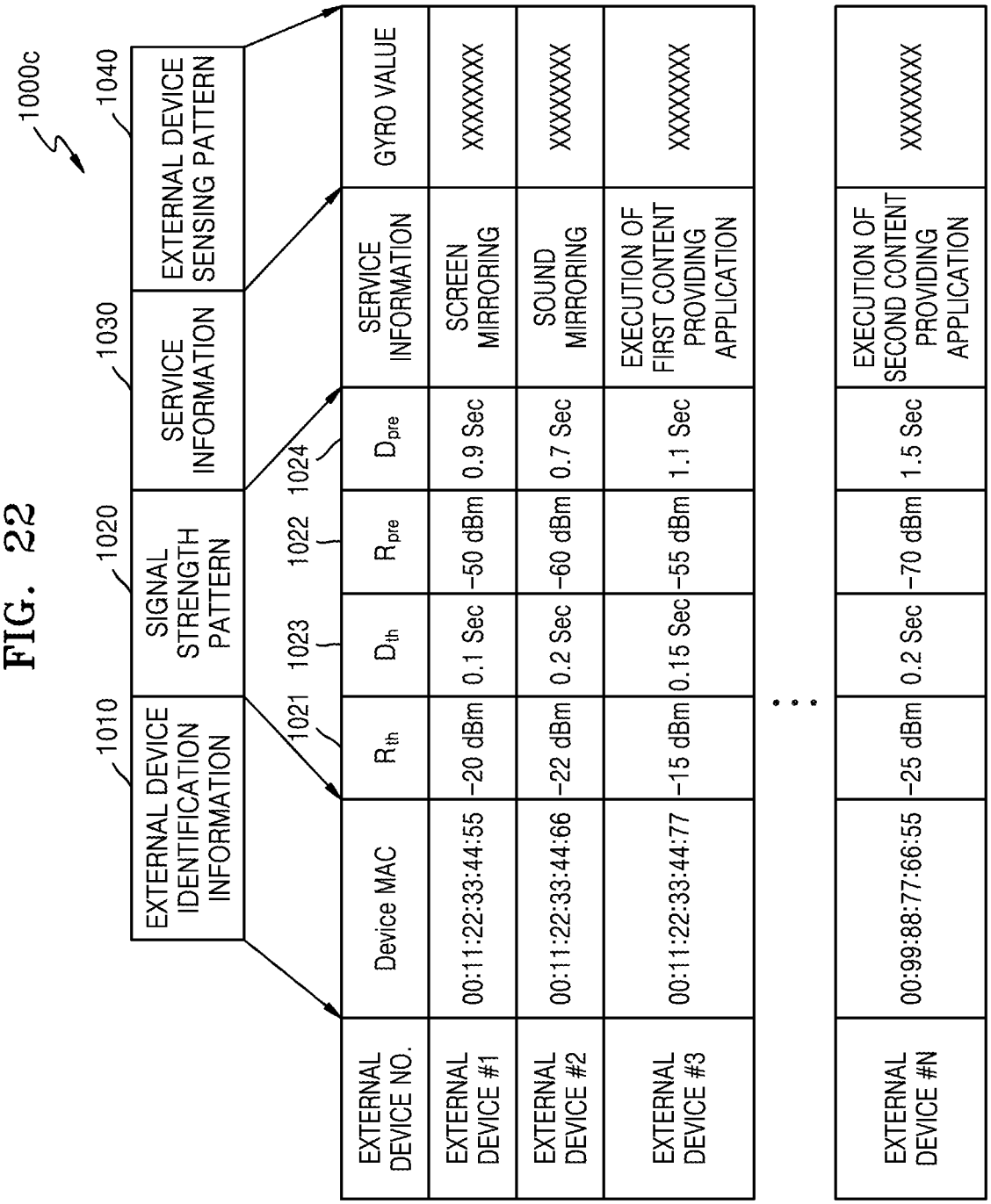
FIG. 22 is a diagram illustrating an example of customized wireless tag information further including a sensing pattern of an external device, according to various embodiments.

FIG. 22 is a diagram illustrating an example of customized wireless tag information 1000c further including a sensing pattern of an external device, according to various embodiments.

Referring to FIG. 22, the customized wireless tag information 1000c may further include an external device sensing pattern 1040 compared to the customized wireless tag information 1000b shown in FIG. 12.

The external device sensing pattern 1040 may include a sensing pattern value serving as a criterion for determining whether a wireless tag event occurs, based on a sensing value of the external device 200 received from the external device 200.

An operation of generating a wireless tag event based on a wireless tag operation using created customized wireless tag information will now be described in greater detail below with reference to FIGS. 23 to 30.

Figure 23:
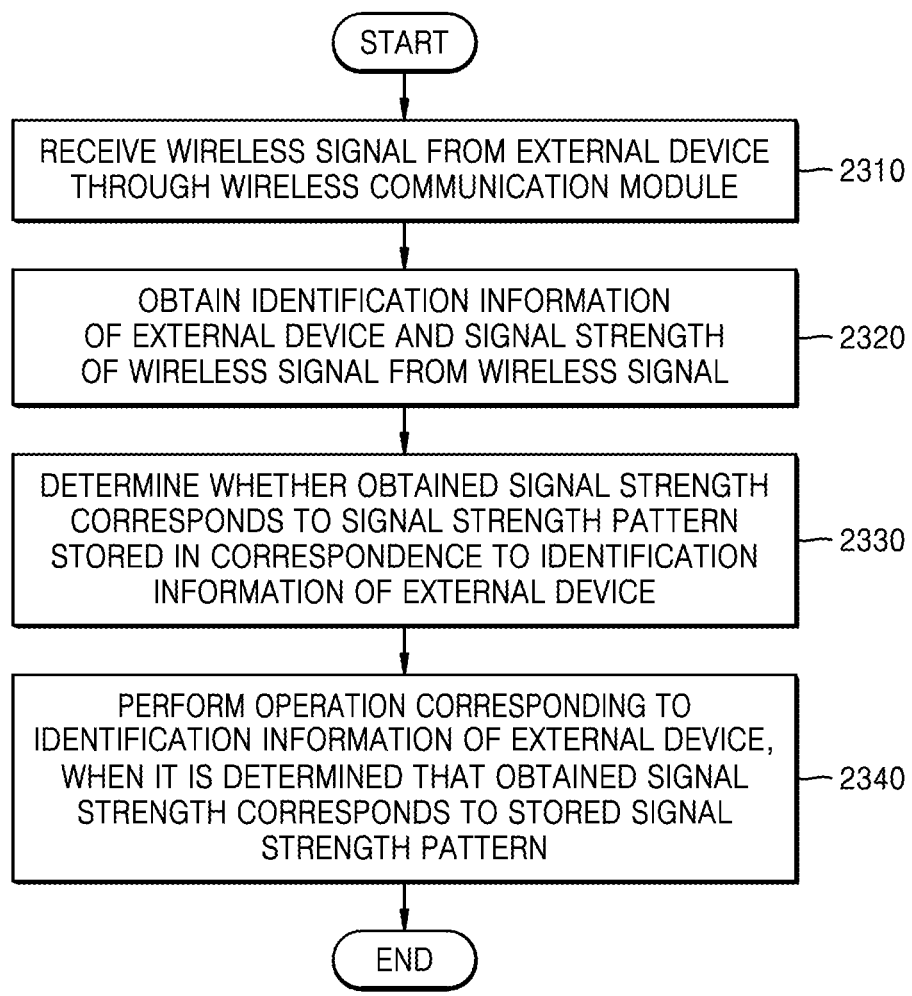
FIG. 23 is a flowchart illustrating an example method of operating an electronic apparatus using a wireless tag operation, according to various embodiments.

FIG. 23 is a flowchart illustrating an example method of operating the electronic apparatus 100 using a wireless tag operation, according to various embodiments.

Referring to FIG. 23, in operation 2310, the electronic apparatus 100 may receive a wireless signal from an external device through a wireless communication module. For example, the electronic apparatus 100 may receive a Wi-Fi signal from the external device through a Wi-Fi communication module, or receive a Bluetooth signal from the external device through a Bluetooth communication module.

In operation 2320, the electronic apparatus 100 may obtain identification information of the external device and a signal strength of the wireless signal from the received wireless signal.

According to an embodiment, the wireless signal may further include a sensing value of the external device in addition to the identification information of the external device and the signal strength of the wireless signal and, in that case, the electronic apparatus 100 may further obtain the sensing value of the external device from the wireless signal.

In operation 2330, the electronic apparatus 100 may identify whether the obtained signal strength corresponds to a signal strength pattern stored in correspondence to the identification information of the external device.

For example, the electronic apparatus 100 may find a signal strength pattern stored in correspondence to the identification information of the external device, from the customized wireless tag information 1000a shown in FIG. 10, the customized wireless tag information 1000b shown in FIG. 11, the customized wireless tag information shown in FIG. 19, the customized wireless tag information 1000c shown in FIG. 22, or the like, and identify whether the obtained signal strength corresponds to the found signal strength pattern.

According to an embodiment, when the sensing value is further obtained from the wireless signal, the electronic apparatus 100 may identify whether the obtained signal strength and sensing value respectively correspond to the signal strength pattern and sensing pattern stored in correspondence to the identification information of the external device.

In operation 2340, based on the obtained signal strength being identified to correspond to the stored signal strength pattern, the electronic apparatus 100 may perform a service operation mapped to the identification information of the external device.

According to an embodiment, when it is determined that a wireless tag event occurs based on the obtained signal strength being identified to correspond to the stored signal strength pattern, the electronic apparatus 100 may perform a service operation stored in correspondence to the identification information of the external device.

Figure 24:
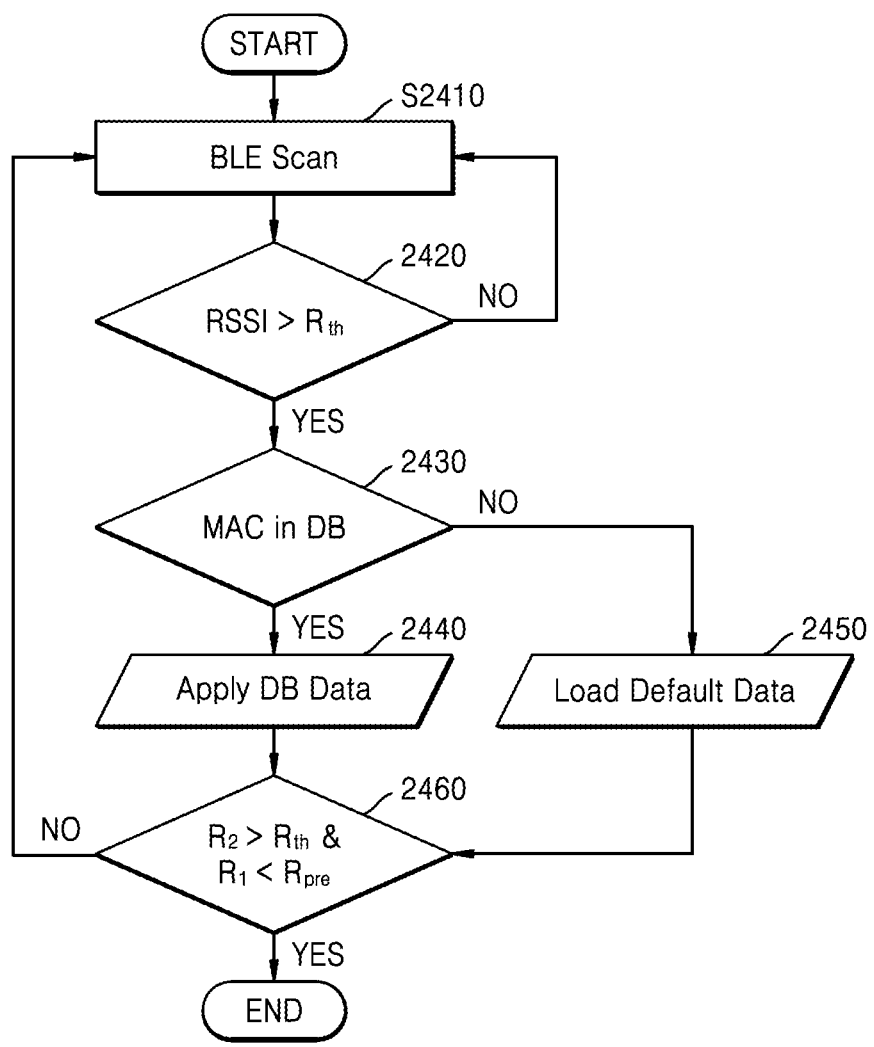
FIG. 24 is a flowchart illustrating an example method of operating an electronic apparatus using a wireless tag operation through Bluetooth communication, according to various embodiments.

FIG. 24 is a flowchart illustrating an example method of operating the electronic apparatus 100 using a wireless tag operation through Bluetooth communication, according to various embodiments.

Referring to FIG. 24, in operation 2410, the electronic apparatus 100 may perform BLE scan through a Bluetooth communication module.

In operation 2420, the electronic apparatus 100 may obtain a signal strength from a Bluetooth signal received through BLE scan, and determine whether the signal strength RSSI is greater than a signal strength upper threshold parameter value Rth. When the obtained signal strength RSSI is less than the signal strength upper threshold parameter value Rth, the electronic apparatus 100 proceeds to operation 2410 to continue BLE scan or, when the obtained signal strength RSSI is greater than the signal strength upper threshold parameter value Rth, the electronic apparatus 100 proceeds to operation 2430.

In operation 2430, the electronic apparatus 100 may search a database for identification information of an external device, e.g. a MAC address, which is obtained from the Bluetooth signal. When the identification information of the external device is found, the electronic apparatus 100 may proceed to operation 2440 or, when the identification information of the external device is not found, the electronic apparatus 100 may proceed to operation 2450.

In operation 2440, when the identification information of the external device is found in the database, the electronic apparatus 100 may obtain a signal strength pattern stored in correspondence to the identification information of the external device. According to an embodiment, the signal strength pattern may include a signal strength upper threshold parameter value Rth and a signal strength lower threshold parameter value Rpre which are stored in correspondence to the external device identification information.

In operation 2450, when the identification information of the external device is not found in the database, the electronic apparatus 100 may obtain a default signal strength pattern. The default signal strength pattern may also include a signal strength upper threshold parameter value Rth and a signal strength lower threshold parameter value Rpre.

In operation 2460, the electronic apparatus 100 may determine whether the highest signal strength R2 is greater than the signal strength upper threshold parameter value Rth and whether a signal strength R1 at a timing prior to the timing of R2 by a predefined time is less than the signal strength lower threshold parameter value Rpre, based on the obtained wireless signal strength. When the above conditions are satisfied, the electronic apparatus 100 may determine that a wireless tag event occurs or, when the above conditions are not satisfied, the electronic apparatus 100 may determine that a wireless tag event is not generated.

Figure 25:
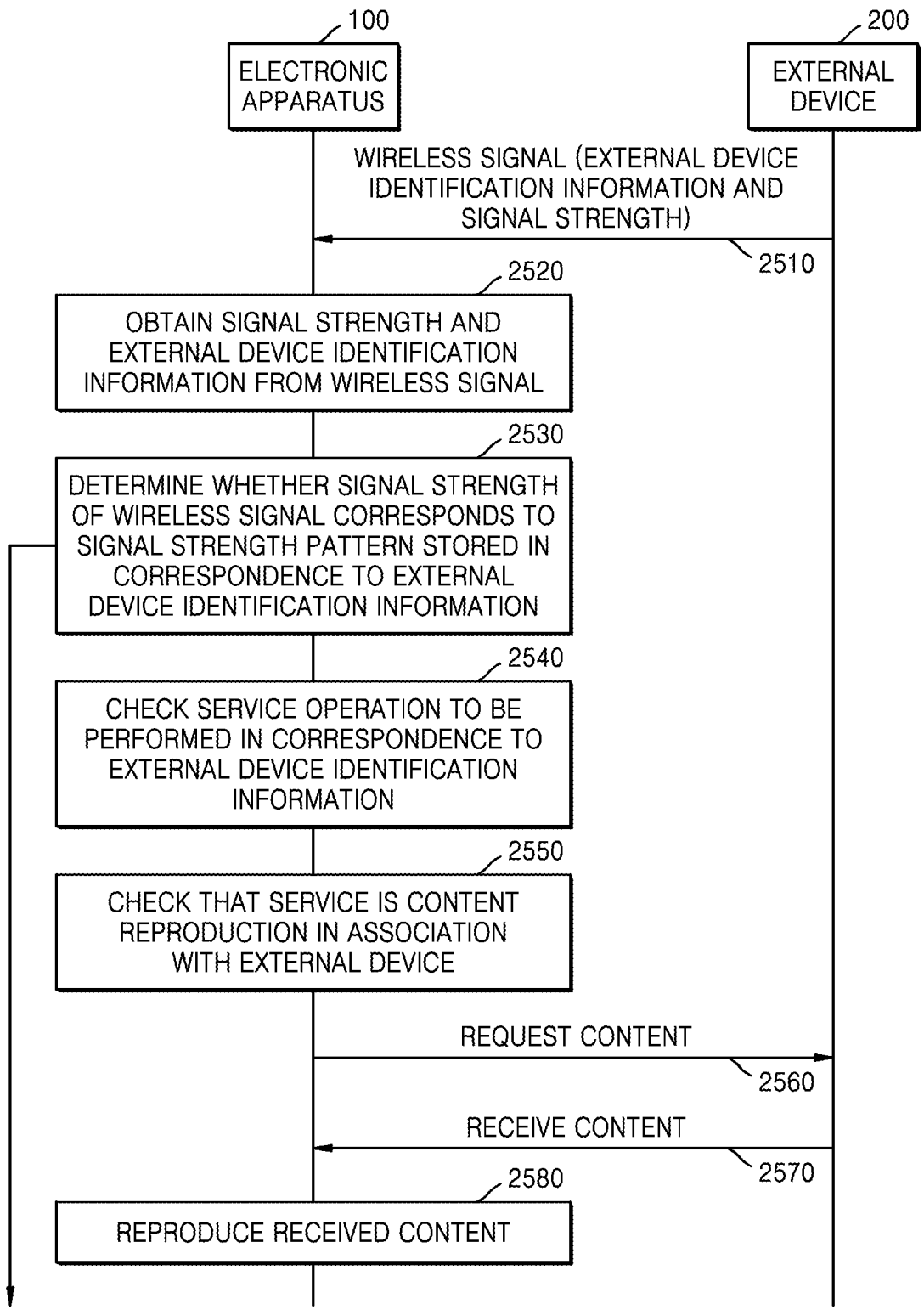
FIG. 25 is a signal flow diagram illustrating an example method of operating an electronic apparatus using a wireless tag operation, according to various embodiments.

FIG. 25 is a signal flow diagram illustrating an example method of operating the electronic apparatus 100 using a wireless tag operation, according to various embodiments.

Referring to FIG. 25, in operation 2510, the electronic apparatus 100 may receive a wireless signal from an external device through a wireless communication module. For example, the electronic apparatus 100 may receive a Wi-Fi signal from the external device through a Wi-Fi communication module, or receive a Bluetooth signal from the external device through a Bluetooth communication module.

In operation 2520, the electronic apparatus 100 may obtain identification information of the external device and a signal strength of the wireless signal from the received wireless signal.

In operation 2530, the electronic apparatus 100 may determine whether the obtained signal strength corresponds to a signal strength pattern stored in correspondence to the identification information of the external device. When the obtained signal strength does not correspond to the signal strength pattern stored in correspondence to the identification information of the external device, the method may be immediately terminated.

For example, the electronic apparatus 100 may find a signal strength pattern stored in correspondence to the identification information of the external device, from the customized wireless tag information 1000*a* shown in FIG. 10, the customized wireless tag information 1000*b* shown in FIG. 11, the customized wireless tag information shown in FIG. 19, the customized wireless tag information 1000*c* shown in FIG. 22, or the like, and identify whether the obtained signal strength corresponds to the found signal strength pattern.

In operation 2540, based on the obtained signal strength being identified to correspond to the stored signal strength pattern, the electronic apparatus 100 may check a service operation mapped to the identification information of the external device.

According to an embodiment, when it is determined that a wireless tag event occurs based on the obtained signal strength being identified to correspond to the stored signal strength pattern, the electronic apparatus 100 may obtain and check a service operation stored in correspondence to the identification information of the external device.

In operation 2550, the electronic apparatus 100 may check that the obtained service is a service of reproducing content in association with the external device.

In operation 2560, the electronic apparatus 100 may request content or content information from the external device 200, based on a service type. For example, when the service is screen mirroring or sound mirroring, the electronic apparatus 100 may request at least one of identification information of content to be reproduced, access information, or the content itself.

In operation 2570, the electronic apparatus 100 may receive the requested content or content information from the external device 200.

In operation 2580, the electronic apparatus 100 may reproduce the content using the received content or content information.

Figure 26:
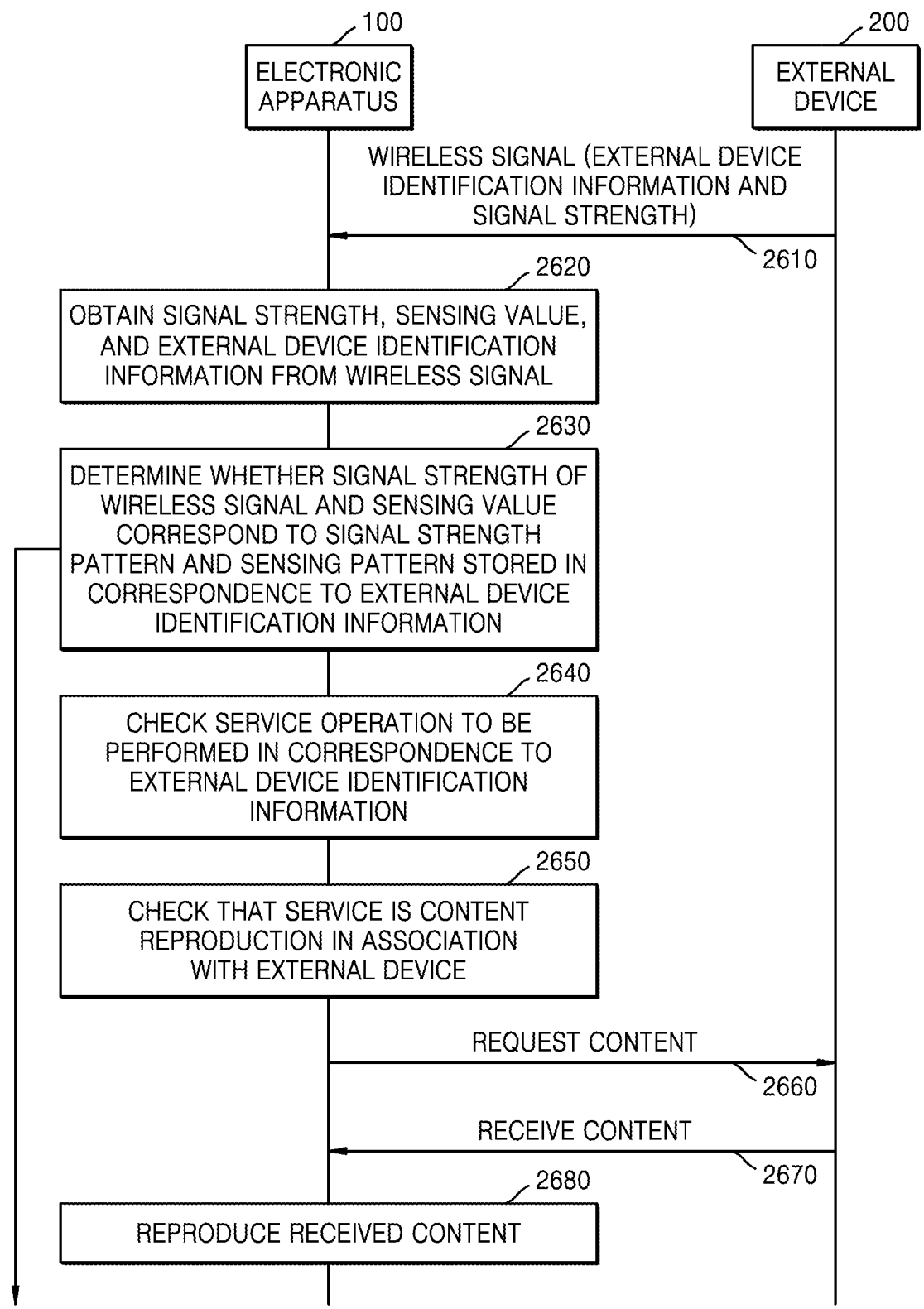
FIG. 26 is a signal flow diagram illustrating an example method of operating an electronic apparatus using a wireless tag operation, according to various embodiments.

FIG. 26 is a signal flow diagram illustrating an example method of operating the electronic apparatus 100 using a wireless tag operation, according to various embodiments.

Referring to FIG. 26, in operation 2610, the electronic apparatus 100 may receive a wireless signal from an external device through a wireless communication module. For example, the electronic apparatus 100 may receive a Wi-Fi signal from the external device through a Wi-Fi communication module, or receive a Bluetooth signal from the external device through a Bluetooth communication module.

In operation 2620, the electronic apparatus 100 may obtain identification information of the external device, a signal strength of the wireless signal, and a sensing value of the external device from the received wireless signal.

In operation 2630, the electronic apparatus 100 may identify whether the obtained signal strength corresponds to a signal strength pattern stored in correspondence to the identification information of the external device, and whether the obtained sensing value corresponds to a sensing pattern stored in correspondence to the identification information of the external device.

For example, the electronic apparatus 100 may find a signal strength pattern and sensing pattern stored in correspondence to the identification information of the external device, from the customized wireless tag information 1000*c* shown in FIG. 22, or the like, and identify whether the obtained signal strength corresponds to the found signal strength pattern, and whether the obtained sensing value corresponds to the stored sensing pattern. When the obtained signal strength and sensing value do not correspond to the signal strength pattern/sensing pattern stored in correspondence to the identification information of the external device, the method may be immediately terminated.

In operation 2640, based on the obtained signal strength being identified to correspond to the stored signal strength pattern and the obtained sensing value being identified to correspond to the stored sensing pattern, the electronic apparatus 100 may check a service operation mapped to the identification information of the external device.

In operation 2650, the electronic apparatus 100 may check that the obtained service is a service of reproducing content in association with the external device.

In operation 2660, the electronic apparatus 100 may request content or content information from the external device 200, based on a service type. For example, when the service is screen mirroring or sound mirroring, the electronic apparatus 100 may request at least one of identification information of content to be reproduced, access information, or the content itself.

In operation 2670, the electronic apparatus 100 may receive the requested content or content information from the external device 200.

In operation 2680, the electronic apparatus 100 may reproduce the content using the received content or content information.

Figure 27:
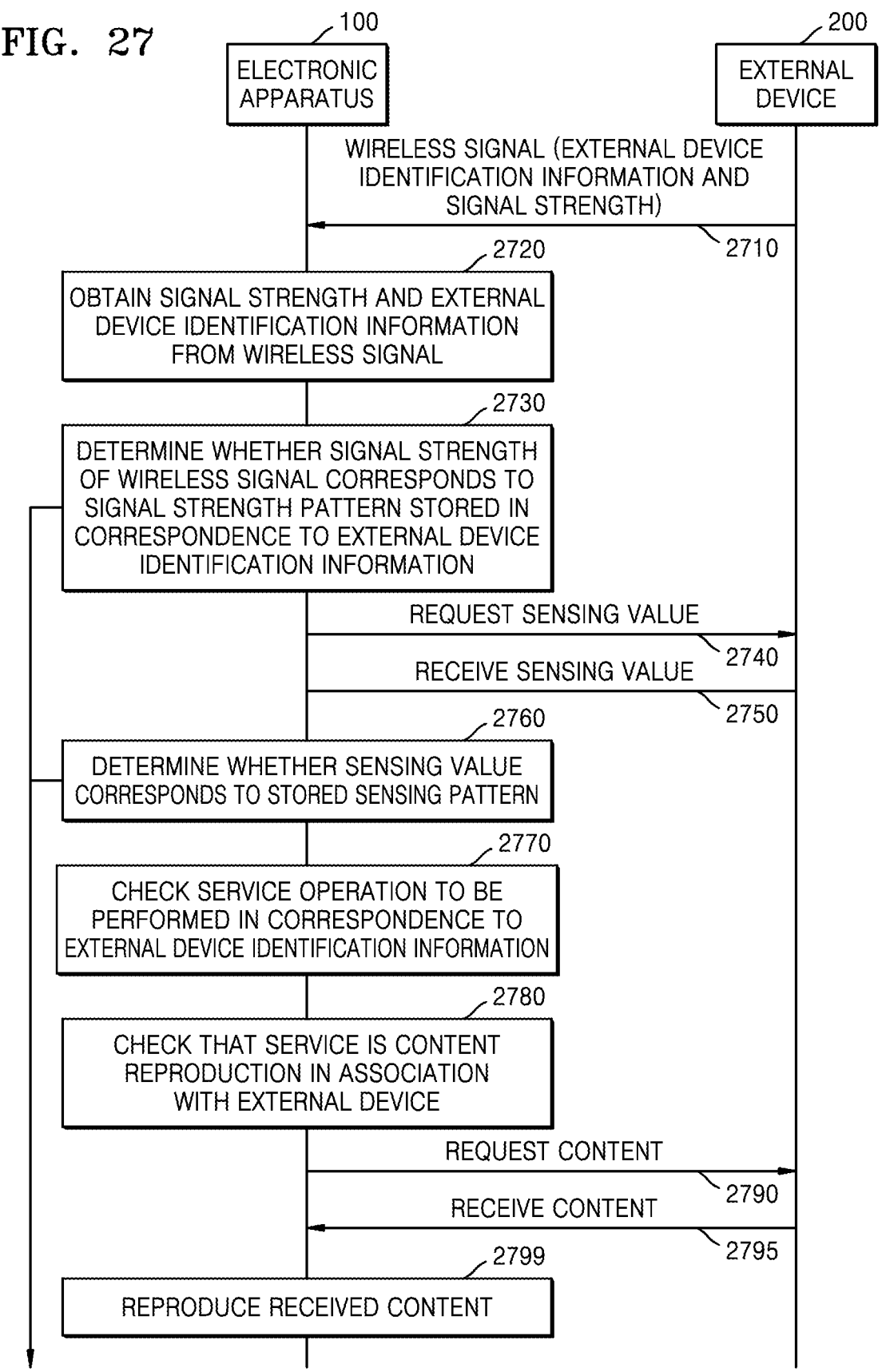
FIG. 27 is a signal flow diagram illustrating an example method of operating an electronic apparatus using a wireless tag operation, according to various embodiments.

FIG. 27 is a signal flow diagram illustrating an example method of operating the electronic apparatus 100 using a wireless tag operation, according to various embodiments.

Referring to FIG. 27, in operation 2710, the electronic apparatus 100 may receive a wireless signal from an external device through a wireless communication module. For example, the electronic apparatus 100 may receive a Wi-Fi signal from the external device through a Wi-Fi communication module, or receive a Bluetooth signal from the external device through a Bluetooth communication module.

In operation 2720, the electronic apparatus 100 may obtain identification information of the external device, a signal strength of the wireless signal, and a sensing value of the external device from the received wireless signal.

In operation 2730, the electronic apparatus 100 may identify whether the obtained signal strength corresponds to a signal strength pattern stored in correspondence to the identification information of the external device.

For example, the electronic apparatus 100 may find a signal strength pattern stored in correspondence to the identification information of the external device, from the customized wireless tag information 1000c shown in FIG. 22, or the like, and identify whether the obtained signal strength corresponds to the found signal strength pattern. When the obtained signal strength does not correspond to the signal strength pattern stored in correspondence to the identification information of the external device, the method may be immediately terminated.

In operation 2740, based on the obtained signal strength being identified to correspond to the stored signal strength pattern, the electronic apparatus 100 may request a sensing value from the external device. That is, because always including the sensing value in the wireless signal may place a burden on the external device, the electronic apparatus 100 may request the sensing value when the signal strength matches to a certain extent.

In operation 2750, the electronic apparatus 100 may receive the sensing value from the external device in response to the request.

In operation 2760, the electronic apparatus 100 may identify whether the received sensing value corresponds to a stored sensing pattern. When the received sensing value does not correspond to the stored sensing pattern, the method may be immediately terminated.

In operation 2770, based on the received sensing value being identified to correspond to the stored sensing pattern, the electronic apparatus 100 may check a service operation mapped to the identification information of the external device.

In operation 2780, the electronic apparatus 100 may check that the obtained service is a service of reproducing content in association with the external device.

In operation 2790, the electronic apparatus 100 may request content or content information from the external device 200, based on a service type. For example, when the service is screen mirroring or sound mirroring, the electronic apparatus 100 may request at least one of identification information of content to be reproduced, access information, or the content itself.

In operation 2795, the electronic apparatus 100 may receive the requested content or content information from the external device 200.

In operation 2799, the electronic apparatus 100 may reproduce the content using the received content or content information.

In a normal mode in which the electronic apparatus 100 may process a command based on a user input, when a wireless signal is received, an operation related to determination of generation of a wireless tag event may be performed by an application processor. On the other hand, in a standby mode (or a low power mode or a sleep mode) of the electronic apparatus 100, because power to the application processor is cut off, the operation related to determination of generation of a wireless tag event may be performed by a wireless communication module.

Figure 28:
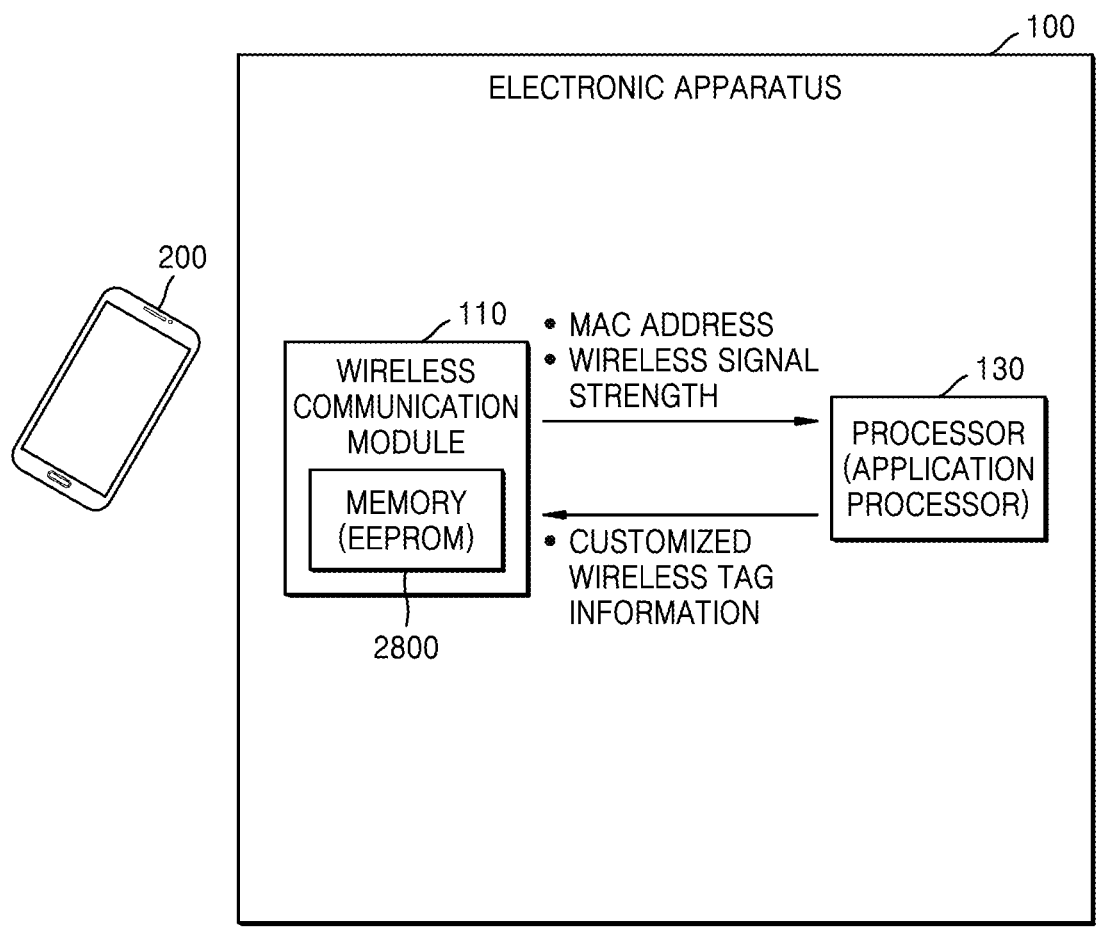
FIG. 28 is a is a diagram illustrating an entity for performing an operation related to determination of generation of a wireless tag event, in a normal mode of an electronic apparatus, according to various embodiments.

FIG. 28 is a diagram illustrating an example entity for performing an operation related to determination of generation of a wireless tag event, in a normal mode of an electronic apparatus, according to various embodiments.

Referring to FIG. 28, when a wireless signal is received from the external device 200, the wireless communication module 110 of the electronic apparatus 100 may extract external device identification information, e.g., a MAC address, and a wireless signal strength from the received wireless signal, and transmit the extracted external device identification information and wireless signal strength to the processor 130. The processor 130 may be called an application processor. The processor 130 may perform a wireless tag-related operation using the received external device identification information and wireless signal strength. When the received wireless signal is a training wireless signal, the processor 130 may create customized wireless tag information corresponding to the external device, using the received external device identification information and wireless signal strength. When the received wireless signal is a wireless signal based on a wireless tag operation, the processor 130 may extract a signal strength pattern stored in correspondence to the external device, determine whether the received wireless signal is determined as generation of a wireless tag event, and perform a service operation stored in correspondence to the external device, when the received wireless signal is determined as generation of a wireless tag event.

Meanwhile, when the customized wireless tag information is created in correspondence to the received training wireless signal, the processor 130 may transmit the created customized wireless tag information to the wireless communication module 110 such that the created customized wireless tag information may be stored in a memory 2800 of the wireless communication module 110, e.g., EEPROM. The stored customized wireless tag information may be used by the wireless communication module 110 to determine generation of a wireless tag event, in a standby mode of the electronic apparatus 100.

As described above, the operation of transmitting the customized wireless tag information from the processor 130 to the wireless communication module 110 and recording the same in the wireless communication module 110 may be performed immediately after the customized wireless tag information is created, or before the electronic apparatus 100 enters a standby mode.

Figure 29:
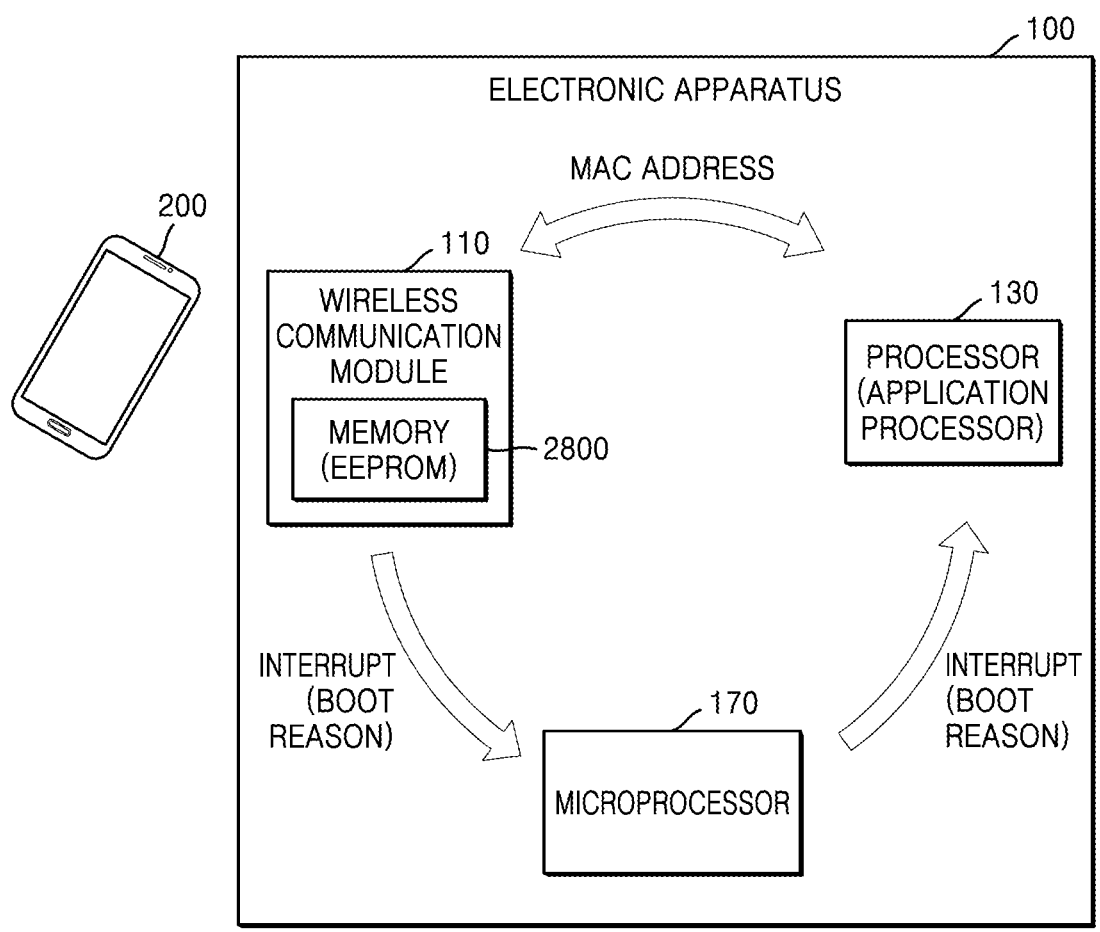
FIG. 29 is a diagram illustrating an entity for performing an operation related to determination of generation of a wireless tag event, in a standby mode of an electronic apparatus, according to various embodiments.

FIG. 29 is a diagram illustrating an example entity for performing an operation related to determination of generation of a wireless tag event, in a standby mode of an electronic apparatus, according to various embodiments.

Referring to FIG. 29, when a wireless signal is received from the external device 200, the wireless communication module 110 of the electronic apparatus 100 may extract external device identification information, e.g., a MAC address, and a wireless signal strength from the received wireless signal, find the external device identification information from customized wireless tag information stored in the memory 2800, and identify whether the strength of the received wireless signal corresponds to a signal strength pattern stored in correspondence to the found external device identification information. Based on the strength of the received wireless signal being identified to correspond to the stored signal strength pattern, the wireless communication module 110 may determine that a wireless tag event occurs.

As described above, when the wireless communication module 110 determines that a wireless tag event occurs, the wireless communication module 110 may transmit an interrupt signal to the microprocessor 170 together with a <boot reason>. The <boot reason> may include information about a service operation to be performed when a wireless tag event occurs in correspondence to the identification information of the external device. As described above, by including the information about a service operation to be performed by the processor 130, directly in the <boot reason>, an operation required to be first performed when power is supplied to the processor 130 may be defined.

The microprocessor 170 having received the interrupt signal together with the <boot reason> may transmit the received interrupt signal including the <boot reason>, to the processor 130 to wake up the processor 130 and, at the same time, notify the operation to be first performed when the processor 130 is woken up.

The processor 130 having received the interrupt signal together with the <boot reason> may be woken up by supply of power and check the operation to be first performed by the processor 130, from the <boot reason> included in the interrupt signal. For example, when a content reproduction operation such as screen mirroring or sound mirroring is checked from the <boot reason>, the application processor 130 may request external device information from the wireless communication module 110 to identify the external device, and the wireless communication module 110 may provide identification information of the external device, e.g., a MAC address, to the processor 130. The application processor 130 having received the identification information of the external device may perform the content reproduction operation recorded in the <boot reason>, by starting communication with the external device using the identification information of the external device, e.g., the MAC address.

An embodiment may be implemented in the form of a non-transitory computer-readable recording medium including instructions executable by a computer, e.g., a program module executable by the computer. The computer-readable medium may be an arbitrary available medium accessible by the computer, and examples thereof include all of volatile and non-volatile media, and removable and non-removable media. The computer-readable medium may include a computer storage medium. Examples of the computer storage medium include all of volatile and non-volatile, and removable and non-removable media implemented using an arbitrary method or technology for storing information such as computer-readable instructions, data structures, program modules, or other data.

The above-described example embodiments may be implemented using a software program including instructions stored in a computer-readable storage medium.

The computer may include a device capable of fetching instructions stored in a storage medium, and operating according to the afore-described embodiments based on the fetched instructions, and may include an electronic apparatus according to the afore-described embodiments.

The computer-readable storage medium may be provided in the form of a non-transitory storage medium. When the storage medium is 'non-transitory', the storage medium does not include signals and is tangible, and it does not limit that data is semi-permanently or temporarily stored in the storage medium.

A control method according to the above-described embodiments may be included and provided in a computer program product. The computer program product may be traded between a seller and a purchaser as a commercial product.

The computer program product may include a software program, and a computer-readable storage medium having the software program stored therein. For example, the computer program product may include a commercial product that is electronically distributed in the form of a software program (e.g., a downloadable application) via a device manufacturer or an electronic market (e.g., Google Play or App Store). For electronic distribution, at least a part of the software program may be stored in the storage medium or be temporarily generated. In this case, the storage medium may be a storage medium of a server of the manufacturer, a server of the electronic market, or a relay server that temporarily stores the software program.

The computer program product may include a storage medium of a server or a storage medium of a device in a system including the server and the device. Alternatively, when a third device (e.g., a smartphone) communicatively connected to the server or the device is present, the computer program product may include a storage medium of the third device. The computer program product may include a software program itself that is transmitted from the server to the device or the third device, or from the third device to the device.

In this case, one of the server, the device, and the third device may execute the computer program product to perform the method according to the afore-described embodiments. Alternatively, two or more of the server, the device, and the third device may execute the computer program product to perform the method according to the afore-described embodiments in a distributed fashion.

For example, the server (e.g., a cloud server or an artificial intelligence (AI) server) may execute the computer program product stored therein, to control the device, which is communicatively connected to the server, to perform the method according to the afore-described embodiments.

As another example, the third device may execute the computer program product to control the device, which is communicatively connected to the third device, to perform the method according to the afore-described embodiments. When the third device executes the computer program product, the third device may download the computer program product from the server and execute the downloaded computer program product. Alternatively, the third device may execute the computer program product, which is provided in a preloaded state, to perform the method according to the afore-described embodiments.

As used herein, the term "unit" may indicate a hardware component such as a processor or a circuit, and/or a software component executable by the hardware component such as the processor, or any combination thereof.

The above descriptions of the disclosure are provided for the purpose of illustration, and it will be understood by one of ordinary skill in the art that various changes in form and details may be easily made therein without departing from the scope of the disclosure, including the appended claims and their equivalents. Therefore, it should be understood that the various example embodiments described herein should be considered in a descriptive sense only and not for purposes of limitation. For example, each component described to be of a single type can be implemented in a distributed manner and, likewise, components described as being distributed can be implemented in a combined manner. It will also be understood that any of the embodiment(s) described herein may be used in conjunction with any other embodiment(s) described herein.

What is claimed is:

1. An electronic apparatus comprising:
a wireless communication module comprising communication circuitry;
memory storing one or more instructions; and
at least one processor, comprising processor circuitry, configured individually and/or collectively to execute the one or more instructions stored in the memory and to:
receive a wireless signal from an external device through the wireless communication module;
obtain identification information of the external device and a signal strength of the wireless signal from the wireless signal;
obtain a signal strength pattern stored in correspondence with the identification information of the external device from among a plurality of signal strength patterns;
identify whether the obtained signal strength corresponds to the obtained signal strength pattern corresponding to the identification information of the external device; and
perform a content reproduction operation registered in correspondence with the identification information of the external device, based on the obtained signal strength being identified to correspond to the stored signal strength pattern.

2. The electronic apparatus of claim 1, wherein the signal strength pattern includes a signal strength at a first timing, and a signal strength at a second timing prior to the first timing by a specified time.

3. The electronic apparatus of claim 2, wherein the at least one processor is further configured individually and/or collectively to: identify that the obtained signal strength corresponds to the stored signal strength pattern, based on the signal strength of the wireless signal at the first timing being greater than or equal to a first threshold value and the signal strength of the wireless signal at the second timing being less than or equal to a second threshold value.

4. The electronic apparatus of claim 1, wherein the content reproduction operation corresponding to the identification information of the external device comprises at least one of an audio visual content reproduction operation or an audio content reproduction operation.

5. The electronic apparatus of claim 1, wherein the at least one processor is further configured individually and/or collectively to:
obtain a sensing value of the external device from the wireless signal;
identify whether the obtained sensing value corresponds to a stored sensing value pattern corresponding to the identification information of the external device; and
perform the operation corresponding to the identification information of the external device, based on the obtained signal strength being identified to correspond to the stored signal strength pattern and the obtained sensing value being identified to correspond to the stored sensing value pattern.

6. The electronic apparatus of claim 1, wherein the at least one processor is further configured individually and/or collectively to:
pre-store, in the memory, the signal strength pattern corresponding to the identification information of the external device.

7. The electronic apparatus of claim 6, wherein the at least one processor is further configured individually and/or collectively to:
receive a training wireless signal from the external device;
determine the signal strength pattern, based on the received training wireless signal; and
store the determined signal strength pattern in association with the identification information of the external device.

8. The electronic apparatus of claim 7, wherein the at least one processor is further configured individually and/or collectively to:
receive, using an input, operation information indicating an operation to be performed based on the strength of the wireless signal received from the external device being identified to correspond to the determined signal strength pattern; and
store the operation information in association with the identification information of the external device.

9. The electronic apparatus of claim 7, wherein the at least one processor is further configured individually and/or collectively to:
receive, using an input, signal sensitivity information used to determine the signal strength pattern based on the training wireless signal; and
determine the signal strength pattern with reference to the received signal sensitivity information.

10. The electronic apparatus of claim 6, wherein the at least one processor is further configured individually and/or collectively to:
control the signal strength pattern corresponding to the identification information of the external device, to be stored in the wireless communication module.

11. The electronic apparatus of claim 10, wherein, in a low power mode of the electronic apparatus, the wireless communication module is configured to:
receive a wireless signal from the external device; and
transmit an interrupt signal to a microcomputer or to the at least one processor to trigger performance of a stored operation corresponding to the identification information of the external device, based on a signal strength obtained from the received wireless signal being identified to correspond to the stored signal strength pattern corresponding to the identification information of the external device.

12. A method of operating an electronic apparatus, the method comprising:
receiving a wireless signal from an external device through a wireless communication module;
obtaining identification information of the external device and a signal strength of the wireless signal from the wireless signal;
obtaining a signal strength pattern stored in correspondence with the identification information of the external device from among a plurality of signal strength patterns;
identifying whether the obtained signal strength corresponds to the obtained-signal strength pattern corresponding to the identification information of the external device; and
performing a content reproduction operation registered in correspondence with the identification information of the external device, based on the obtained signal strength being identified to correspond to the stored signal strength pattern.

13. The method of claim 12, wherein the signal strength pattern includes a signal strength at a first timing, and a signal strength at a second timing prior to the first timing by a specified time.

14. The method of claim 13, further comprising:
identifying that the obtained signal strength corresponds to the stored signal strength pattern, based on the signal strength of the wireless signal at the first timing being greater than or equal to a first threshold value and the signal strength of the wireless signal at the second timing being less than or equal to a second threshold value.

15. A non-transitory computer-readable recording medium having recorded thereon one or more programs which, when executed by a processor of an electronic apparatus, cause the electronic apparatus to perform operations comprising:

receiving a wireless signal from an external device through a wireless communication module;

obtaining identification information of the external device and a signal strength of the wireless signal from the wireless signal;

obtaining a signal strength pattern stored in correspondence with the identification information of the external device from among a plurality of signal strength patterns;

identifying whether the obtained signal strength corresponds to the obtained signal strength pattern corresponding to the identification information of the external device; and performing a content reproduction operation registered in correspondence with the identification information of the external device, based on the obtained signal strength being identified to correspond to the stored signal strength pattern.

* * * * *